United States Patent
Ketterer et al.

(10) Patent No.: US 12,072,182 B2
(45) Date of Patent: Aug. 27, 2024

(54) ACQUISITION DEVICE AND METHOD FOR ACQUIRING SETS OF MULTIPLE OBJECT DATA OF AT LEAST ONE OBJECT

(71) Applicant: Robert Bosch GmbH, Stuttgart (DE)

(72) Inventors: Darno Alexander Ketterer, Renningen (DE); Christin Ketterer, Renningen (DE); Julian Weiss, Leonberg (DE); Sebastian Schmitt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1116 days.

(21) Appl. No.: 16/756,456

(22) PCT Filed: Oct. 26, 2018

(86) PCT No.: PCT/EP2018/079464
§ 371 (c)(1),
(2) Date: Apr. 15, 2020

(87) PCT Pub. No.: WO2019/081739
PCT Pub. Date: May 2, 2019

(65) Prior Publication Data
US 2021/0197233 A1    Jul. 1, 2021

(30) Foreign Application Priority Data

Oct. 27, 2017    (DE) .................... 10 2017 219 407.3

(51) Int. Cl.
*B07C 5/10*        (2006.01)
*B07C 3/08*        (2006.01)
(Continued)

(52) U.S. Cl.
CPC .............. *G01B 5/0002* (2013.01); *B07C 3/08* (2013.01); *B07C 5/10* (2013.01); *B07C 5/28* (2013.01);
(Continued)

(58) Field of Classification Search
CPC ..... B07C 2501/0063; B07C 3/08; B07C 5/00; B07C 5/10; B07C 5/28; B07C 5/36;
(Continued)

(56) References Cited

U.S. PATENT DOCUMENTS

| 4,385,701 A | 5/1983 | Buckminster et al. |
| 6,011,255 A * | 1/2000 | Rueb ..................... G01B 11/02 |
| | | 250/559.19 |

(Continued)

FOREIGN PATENT DOCUMENTS

| CN | 201514378 U | 6/2010 |
| CN | 104303010 A | 1/2015 |

(Continued)

OTHER PUBLICATIONS

International Search Report dated Feb. 4, 2019 in connection with International Application No. PCT/EP2018/079464.

*Primary Examiner* — Peter B Kim
(74) *Attorney, Agent, or Firm* — NORTON ROSE FULBRIGHT US LLP; Gerard A. Messina

(57) ABSTRACT

An acquisition device for at least semiautomated acquisition of sets of multiple object data of at least one object, including a movement device for generating a defined relative movement between at least one object data acquisition unit and the at least one object.

17 Claims, 10 Drawing Sheets

(51) Int. Cl.
*B07C 5/28* (2006.01)
*B07C 5/36* (2006.01)
*B25J 9/16* (2006.01)
*G01B 5/00* (2006.01)
*G01B 11/04* (2006.01)
*G01B 11/24* (2006.01)
*G01D 21/02* (2006.01)
*H04N 7/18* (2006.01)
*H04N 23/54* (2023.01)
*H04N 23/55* (2023.01)
*H04N 23/56* (2023.01)
*H04N 23/61* (2023.01)
*H04N 23/695* (2023.01)
*H04N 23/90* (2023.01)

(52) U.S. Cl.
CPC .............. *B07C 5/36* (2013.01); *B25J 9/1664* (2013.01); *B25J 9/1669* (2013.01); *B25J 9/1697* (2013.01); *G01B 11/04* (2013.01); *G01B 11/24* (2013.01); *G01D 21/02* (2013.01); *H04N 7/18* (2013.01); *H04N 23/54* (2023.01); *H04N 23/55* (2023.01); *H04N 23/56* (2023.01); *H04N 23/61* (2023.01); *H04N 23/695* (2023.01); *H04N 23/90* (2023.01); *B07C 2501/0063* (2013.01); *G01B 2210/54* (2013.01)

(58) Field of Classification Search
CPC ...... B25J 9/1664; B25J 9/1669; B25J 9/1697; B01D 21/00; B01D 21/02; G01B 11/02; G01B 11/04; G01B 11/24; G01B 11/245; G01B 2210/54; G01B 5/0002; G01B 5/0004; H04N 23/54; H04N 23/55; H04N 23/56; H04N 23/61; H04N 23/695; H04N 23/90; H04N 7/18
See application file for complete search history.

(56) References Cited

U.S. PATENT DOCUMENTS

| | | | |
|---|---|---|---|
| 11,499,810 B2* | 11/2022 | Ketterer | B07C 5/10 |
| 2006/0273167 A1 | 12/2006 | Baldassari et al. | |
| 2010/0082151 A1 | 4/2010 | Young et al. | |
| 2014/0111615 A1 | 4/2014 | McGuire et al. | |
| 2015/0163474 A1* | 6/2015 | You | G01B 11/2513 348/46 |
| 2020/0050834 A1* | 2/2020 | Niskanen | G06F 18/22 |
| 2020/0346346 A1* | 11/2020 | Ketterer | B07C 5/36 |
| 2020/0363242 A1* | 11/2020 | Ketterer | B25J 9/1664 |

FOREIGN PATENT DOCUMENTS

| | | | |
|---|---|---|---|
| CN | 105353573 A | 2/2016 | |
| CN | 107121089 A | 9/2017 | |
| DE | 4035799 A1 | 5/1992 | |
| DE | 102010034717 A1 | 2/2012 | |
| DE | 202016002239 U1 | 7/2016 | |
| WO | WO-0233348 A1 * | 4/2002 | ........... G01B 11/245 |

* cited by examiner

ACQUISITION DEVICE AND METHOD FOR ACQUIRING SETS OF MULTIPLE OBJECT DATA OF AT LEAST ONE OBJECT

FIELD

An acquisition device for acquiring sets of multiple object data of at least one object has already been proposed.

SUMMARY

In accordance with the present invention, an acquisition device for at least semiautomated acquisition of sets of multiple object data of at least one object, including a movement device for generating a defined relative movement between at least one object data acquisition unit and the at least one object, is provided.

A "set of object data" includes at least two different object data regarding the same object. A set of multiple object data preferably includes more than ten different object data about the same object. It is particularly preferable for a set of multiple object data to include more than a hundred different object data about the same object. A set of multiple object data preferably includes at least two different types of object data about the same object. "Object data" are to be understood as, in particular, at least one information item, which is suitable for characterizing an object, in particular, for distinguishing it from another object. Object data preferably include characteristics inherent to an object. Object data may include, in particular, appearance, shape, contour, color, symmetry, weight, material, and/or another characteristic appearing useful to one skilled in the art. It is also possible for situation-dependent characteristics to be acquired, for example, a positioning relative to a further object, in particular, to a counterpart, a degree of contamination, and/or a temporary marking.

An "object data acquisition unit" is to be understood as, in particular, a unit, which is intended at least for acquiring a type of object data. The object data acquisition unit is preferably an imaging acquisition unit. In particular, the object data acquisition unit includes a still camera. As an alternative, the object data acquisition unit includes a motion picture camera. The object data acquisition unit preferably has a true-color camera. It is also possible for the object data acquisition unit to have an infrared camera and/or ToF camera. A set of object data preferably includes at least two different photographs of the object data acquisition unit. It is particularly preferable for a set of multiple object data to include at least ten different photographs of the object data acquisition, in particular, from ten different perspectives.

A "defined relative movement" is to be understood as, in particular, a relative change of position and/or orientation, which may be actively controlled and/or regulated in at least a normal operating state of the acquisition device. A defined relative movement along each degree of freedom of motion is preferably capable of being controlled and/or regulated. In particular, in at least one normal operating state, positional data regarding the relative position and/or orientation of the object data acquisition unit with respect to the object may be uniquely assigned to each acquisition of object data by the object data acquisition unit.

A movement device for generating a defined relative movement includes at least a drive unit and a guide unit. A drive unit of the movement device is preferably electromechanical, in particular, it takes the form of an electric motor or, for example, a piezoelectric element for fine adjustment. However, it is also possible for a drive unit of the movement device to be pneumatic or hydraulic. A guide unit is intended, in particular, for guiding an object along the defined relative movement. In particular, a guide unit is intended for minimizing a movement along a direction, which deviates from the defined relative movement. A guide unit may take the form of, for example, a guide rail, swivel arm and/or articulated arm. Preferably, the movement device is intended for generating a defined relative movement between at least one object data acquisition unit and the at least one object. In particular, the movement device is intended for generating a defined relative movement between at least one object data acquisition unit and an object carrier unit, which is provided, in particular, for positioning the object in an object data acquisition region of the acquisition device.

"Semiautomated acquisition" is understood to mean, in particular, that in at least one operating state, at least one set of multiple object data is acquired without manipulation, that is, in particular, without the action of an operator.

In particular, "intended" is to be understood as specially programmed, designed and/or equipped. That an object is intended for a particular function, is to be understood to mean, in particular, that the object fulfills and/or executes this particular function in at least one application state and/or operating state.

Due to the example embodiment of the acquisition device according to the present invention, a large quantity of object data regarding an object may be acquired advantageously rapidly.

In addition, it is provided that the movement device be intended for acquiring object data from multiple perspectives. In particular, object data from multiple perspectives may be acquired, using a defined relative movement of the object data acquisition unit and the object, generated with the aid of the movement device. A "perspective" is to be understood as, in particular, a particular, relative configuration, in particular, position and/or orientation, of the object data acquisition unit and of the object, in particular, of the object carrier unit.

Two perspectives are preferably considered identical, if they only differ by a relative distance between the object data acquisition unit and the object.

In particular, multiple perspectives include at least two different relative configurations of the object data acquisition unit and of the object, in particular, of the object carrier unit. Multiple perspectives preferably include more than ten different relative configurations of the object data acquisition unit and of the object, in particular, of the object carrier unit. It is particularly preferable for multiple perspectives to include more than ten different configurations of the object data acquisition unit relative to the object, in particular, to the object carrier unit. In particular, two perspectives define a measuring plane. Multiple perspectives preferably include at least two different measuring planes. The totality of all of the measuring planes possible, using the movement device, preferably fills the space. Alternatively, a distance between two possible measuring planes is at least less than 1 mm, and/or an angular distance between two possible measuring planes is at least less than 1°. The embodiment of the acquisition device according to the present invention may allow sets of multiple object data to advantageously include object data from all sides of the object.

In addition, it is provided that the example acquisition device include a processing unit, which is intended for carrying out an object learning operation. An "object learning operation" is to be understood as, in particular, processing of the sets of multiple object data for an additional application. For example, an object learning operation may include the generation of a panoramic view of the object, the generation of a three-dimensional model of the object and/or the extraction of characteristic features, in particular, to allow pattern recognition. Preferably, the processing unit is constructed to be spatially separated from the movement device and/or from the object data acquisition unit. The processing unit preferably takes the form of a server. Alternatively, the processing unit is integrated in the object data acquisition unit. A "processing unit" is to be understood as, in particular, a unit having an information input, information processing, and an information output. The processing unit advantageously includes at least one processor, a storage device, input and output devices, further electrical components, an operating program, regulating routines, control routines, and/or computation routines. The components of the processing unit are preferably situated on a common board and/or advantageously situated in a common housing. The embodiment of the acquisition device according to the present invention may allow, in particular, processing of the sets of multiple object data to form a uniform digital representation of the object.

In addition, a further processing unit is provided, which is intended for utilizing a forward movement and return movement of an object data acquisition unit and/or of an object for data acquisition. The movement device and the object data acquisition unit are preferably controlled and/or regulated by a, in particular, central, processing unit. In particular, the processing unit controls and/or regulates the defined, relative movement and at least the acquisition time of the object data acquisition unit. The movement device preferably has a defined starting position, from which a defined, relative movement starts. The further processing unit is preferably intended, in particular, for specifically generating and/or changing a forward movement and return movement of an object data acquisition unit and/or of an object for precise data acquisition. A "starting position of the movement device" is to be understood to mean, in particular, that at least the object data acquisition unit and/or the object, in particular, the object carrier unit, are situated at a fixed position inside of the movement device. The starting position of the movement device preferably includes an orientation of the object data acquisition unit and/or of the object, in particular, of the object carrier unit. In a starting position of the movement device, it is particularly preferable for all of the movable units and elements of the movement device to be situated at a fixed position and to have a fixed orientation. A "forward movement" is to be understood as, in particular, a movement, which leads away from the starting position. A "return movement" is to be understood as, in particular, a movement, which leads to the starting position. A return movement may be carried out by reversing the path of motion during a forward movement, or by moving further along a closed path of motion. The embodiment of the acquisition device according to the present invention may allow an idle time of the machine, which is for restoring the starting position of the movement device between two acquisitions of different sets of multiple object data, to be minimized in an advantageous manner.

In addition, it is provided that the movement device have at least one movement unit for a defined movement of the at least one object data acquisition unit. The movement unit includes at least a guide unit of the object data acquisition unit and a drive unit. Furthermore, it is provided that the movement unit be intended for guiding the at least one object data acquisition unit on an at least partially curved path of motion. A "partially curved path of motion" is to be understood to mean, in particular, that a course of the path of motion has a curvature other than zero in at least a subregion. It is preferably understood to mean that the path of motion includes a circular arc. The circular arc preferably spans a central angle of more than 90°. It is particularly preferable for the circular arc to span a central angle of more than 180°. It is also possible for the path of motion to trace a complete circle. In particular, a central point of a circular arc of the at least partially curved path of motion defines a center of an object measuring region, which is intended for receiving an object for measurement. In this connection, a "curvature" at a point of a curve, which is other than zero, is to be understood as, in particular, a deviation from a straight line, which increases quadratically with a distance from the point of the curve. Using the embodiment of the acquisition device according to the present invention, a change of perspective may easily be executed in an advantageous manner.

In addition, it is provided that the movement unit have at least a partially curved path and be intended for guiding the at least one object data acquisition unit along the at least partially curved path. For guiding the object data acquisition unit, the movement unit preferably has a curved track as a guide unit, in particular, a curved guide rail and/or a curved guide bar. The object data acquisition unit is preferably mounted on a guide block, which, in at least one operating state of the acquisition device, is moved by the drive unit along the curved track. A "partially curved path of motion" is to be understood to mean, in particular, that a course of the path has a curvature other than zero in at least a subregion. It is preferably understood to mean that, in particular, the path includes a circular arc.

The circular arc preferably spans a central angle of more than 90°. It is particularly preferable for the circular arc to span a central angle of more than 180°. It is also possible for the path to trace a complete circle. It is also possible for a curvature of the path to be approximated by at least two straight path segments, which subtend an obtuse or acute angle. The path segments are preferably joined together by a curved path segment to form a continuous path of motion of the object data acquisition unit. Alternatively, each, in particular, straight, path segment has at least one separate object data acquisition unit. Using the embodiment of the acquisition device according to the present invention, a change of perspective may easily be executed in an advantageous manner.

In addition, in accordance with the present invention, it is provided that the movement unit be intended for guiding the at least one object data acquisition unit along a direction at least substantially perpendicular to a path of motion. In particular, the movement unit may generate a superposed movement of the object data acquisition unit along the path of motion and perpendicular to the path of motion. Here, the expression "substantially perpendicularly" shall define, in particular, an orientation of a direction relative to a reference direction; in particular, viewed in a plane, which extends parallelly to the direction and the reference direction, the direction and the reference direction forming an angle of 90°, and the angle having a maximum deviation of, in particular, less than 8°, advantageously, less than 5°, and particularly advantageously, less than 2°. In particular, the object data acquisition unit is movably supported along a straight line, which intersects the object measuring region and the object data acquisition unit. The embodiment of the acquisition device according to the present invention may advantageously allow a working distance of the object data acquisition unit, in particular, a focus, to be adjusted rapidly and simply. In particular, an inexpensive object data acquisition unit having a short range of the working distance may be used. It is also possible for the movement unit to have a swivel axis and/or axis of rotation, about which the guide unit of the object data acquisition unit itself is pivoted and/or rotationally mounted. The embodiment of the acquisition device according to the present invention may allow sets of multiple object data to advantageously include object data from all sides of the object. It is also possible for the guide unit of the object data acquisition unit to be movably supported in a translational manner, in order to measure, in particular, an object, which has a maximum extension that is greater than a maximum extension of the guide unit.

In addition, in accordance with an example embodiment of the present invention, it is provided that the object data acquisition unit include at least one swivel axis and/or axis of rotation, about which the object data acquisition unit is pivoted and/or rotationally mounted. In particular, the object data acquisition unit is pivoted and/or rotationally mounted about a straight line, which intersects the object measuring region and the object data acquisition unit. Using the embodiment of the acquisition device according to the present invention, a measuring region, in particular, an image format, of an, in particular, imaging, object data acquisition unit may be adapted to the object in an advantageous manner. The object data acquisition unit preferably includes an axis of rotation and/or swivel axis, which is substantially perpendicular to the path of motion of the object data acquisition unit. In particular, during and/or after a movement along the path of motion, the axis of rotation and/or swivel axis preferably allows a side of the object data acquisition unit intended for measurement to be oriented substantially perpendicularly to a line, which intersects the object measuring region and the object data acquisition unit. Using the embodiment of the acquisition device according to the present invention, a measuring region of an object data acquisition unit may be adapted to an object. Object data may be maximized by a measurement, while data regarding a background may be simultaneously minimized.

In addition, in accordance with an example embodiment of the present invention, it is provided that the movement unit include a drive unit, which is intended for moving the object data acquisition unit in an automated manner. In particular, "automated" is to be understood to mean that the drive unit is controlled and/or regulated by a, in particular, central, processing unit. In particular, the processing unit controls and/or regulates the drive unit in light of a list of perspectives, which are determined, in particular, beforehand, and from which the object is intended to be measured. In a further refinement, the processing unit could evaluate a data set preliminarily, in order to adjust the list dynamically. A set of multiple data may be acquired rapidly in an advantageous manner.

Furthermore, in accordance with an example embodiment of the present invention, it is provided that the acquisition device include at least one, in particular, the above-mentioned, object carrier unit. The object carrier unit is intended, in particular, for positioning the object in an object data acquisition region of the acquisition device. In particular, the object carrier unit includes at least one object carrier having an object carrier wall, which is intended for absorbing a weight of an object. In particular, in at least one operating state of the acquisition device, the object carrier is designed, such that an object is laid down on the object carrier, in particular, on the object carrier wall. The object carrier wall preferably has no indentations and/or projections. Alternatively, the object carrier wall may have a curvature, in order to reduce the probability that, in particular, a round object and/or a light object falls off the object carrier. It is also possible for an, in particular, interchangeable object carrier to have a retention unit for fixing an object in position on the object carrier. The object carrier is preferably circularly formed in at least one sectional plane. An object measuring region may be identified clearly by the embodiment of the acquisition device according to the present invention. In particular, optimum positioning of an object to be measured in the object measuring region is facilitated.

In addition, in accordance with an example embodiment of the present invention, it is provided that the movement device include a bearing unit, by which object carrier unit is movably supported. The embodiment of the acquisition device according to the present invention may advantageously allow a defined, relative movement of the object and the object data acquisition unit to be designed in various ways.

Furthermore, it is provided that the bearing unit include at least one swivel axis and/or axis of rotation, about which the object carrier unit is pivoted and/or rotationally mounted. The object carrier unit preferably includes a vertical swivel axis and/or axis of rotation. The swivel axis and/or axis of rotation preferably coincides with an axis of symmetry of the object carrier unit. The embodiment of the acquisition device according to the present invention allows a set of multiple object data to include object data from different sides of the object.

It is also provided that the bearing unit embrace the object carrier unit at least partially. "Partially embrace" is to be understood to mean, in particular, that the object carrier unit is situated in a recess of the bearing unit. Preferably, "partially embrace" is to be understood to mean that the largest side face of a smallest, possible, right parallelpiped, which the unit only just surrounds completely, extends into a recess of the bearing unit. Preferably, this should be understood to mean that, in particular, in at least one plane, in which a geometric center of the object carrier unit lies, at least the geometric center is surrounded by the bearing unit over an angular range of at least 140°, preferably, at least 180°. The object carrier unit is preferably situated at a lateral recess of the bearing unit. Alternatively, the bearing unit is positioned at a lower side of the object carrier unit, in particular, a side opposite to the object measuring region. The bearing unit is preferably offset from the vertical axis of rotation and/or swivel axis, so that, in particular, a path of motion of the object data acquisition unit may be extended underneath the object carrier unit. The embodiment of the acquisition device according to the present invention may allow a sturdy set-up of the object carrier unit to be achieved. In particular, a set-up of the bearing unit offset from the axis of rotation may be attained.

In addition, in accordance with an example embodiment of the present invention, it is provided that the bearing unit have at least one path of motion, along which the object carrier unit is movably supported. The path of motion is preferably parallel to a line, which intersects the object measuring region and the object data acquisition unit. In particular, the path of motion runs vertically. The object carrier unit is preferably supported by the bearing unit so as to be able to move at least translationally along a linear axis running at least substantially parallelly to, in particular, coaxially with, the axis of rotation and/or swivel axis. The bearing unit preferably includes at least one lifting unit, with the aid of which the object carrier unit is movably supported along the path of motion. The lifting unit may take the form of a scissor joint, linear bearing, telescopic bearing, or the like. The example embodiment of the acquisition device according to the present invention may advantageously allow a working distance, in particular, a focus, to be adjusted rapidly and simply. In particular, an inexpensive object data acquisition unit having a short range of the working distance may be used. Alternatively, or in addition, a horizontal path of motion is also possible, in order to measure an object, which has a maximum extension that is greater than a maximum extension of the object carrier unit.

In addition, in accordance with an example embodiment of the present invention, it is provided that the movement device include a drive unit, which is intended for moving the object carrier unit in an automated manner. To move the object carrier unit, the drive unit may include at least one actuator, in particular, a linear actuator, such as an electric, hydraulic or pneumatic lifting cylinder or the like, an electric motor, an electromagnetically operated mechanism, or the like. In particular, "automated" is to be understood to mean that the drive unit is controlled and/or regulated by a, in particular, central, processing unit. In particular, the processing unit controls and/or regulates the drive unit in light of a list of perspectives, which are determined, in particular, beforehand, and from which the object is intended to be measured. In a further refinement, the processing unit could evaluate a data set preliminarily, in order to adjust the list dynamically. The drive unit is preferably intended for moving the object carrier unit and the object data acquisition unit in directions opposite to each other, in particular, for moving them contrarotationally about the swivel axis and/or axis of rotation, in particular, in at least one operating state of the acquisition device. In at least one further operating state of the acquisition device, it is also possible for the drive unit to be intended for moving the object carrier unit and the object data acquisition unit relative to each other in the same moving direction, in particular, in the same moving direction about the swivel axis and/or axis of rotation of the bearing unit, in particular, at different speeds. Furthermore, in at least one additional operating state of the acquisition device, it is also possible for the drive unit to be intended for holding the object carrier unit in a fixed position and for moving only the object data acquisition unit relative to the object carrier unit, in particular, about the swivel axis and/or axis of rotation of the bearing unit. The drive unit preferably includes at least one actuator, which is assigned to the object carrier unit, and a further actuator, which is assigned to the object data acquisition unit. However, it is also possible for the drive unit to have a single actuator, which is provided for moving the object carrier unit and the object data acquisition unit, using a gear unit. In addition, it is also possible for the drive unit to take the form of an electromagnetically operated unit and to be intended for moving the object carrier unit and the object data acquisition unit in directions opposite to each other, in particular, for moving them contrarotationally about a swivel axis and/or axis of rotation of the bearing unit. The drive unit is preferably intended for moving the object carrier unit and the object data acquisition unit along opposite, main moving directions. The drive unit is preferably intended for moving the object data acquisition unit along a direction about the object carrier unit, and for moving the object carrier unit about the swivel axis and/or axis of rotation of the bearing unit, in a direction opposite to the object data acquisition unit. With the aid of the example embodiment of the present invention, a plurality of different images of an object from various measurement angles may advantageously be recorded in a short time span, in order to acquire a set of multiple data for the object in an advantageous manner. A set of multiple data may be acquired rapidly in an advantageous manner.

In addition, in accordance with an example embodiment of the present invention, it is provided that the object carrier unit include at least one object carrier, which has an object carrier wall that is transparent in at least one operating state.

"Transparent" is to be understood to mean, in particular, that a transmittance of the object carrier wall, in particular, at a medium wavelength of the spectrum detectable by the object data acquisition unit, is at least greater than 80%, preferably, greater than 90%, and particularly preferably, greater than 95%. The object carrier is preferably made of a transparent material, for example, glass or a polycarbonate. A side of the object facing the object carrier wall may advantageously be measured, using a position of the object data acquisition unit on a side of the object carrier opposite to the object.

Furthermore, it is provided that the object carrier unit have a setting unit, with the aid of which a reflectance, absorbance, and/or transmittance is adjustable. On the object carrier wall, the object carrier preferably has a layer of material, which changes its optical characteristics due to the application of an electric voltage. On the object carrier wall, the object carrier has, in particular, a layer of electrochromic glass or liquid crystal glass. The setting unit is preferably intended for supplying the layer with an adjustable voltage. Using the embodiment of the acquisition device according to the present invention, a change may advantageously be made between a transparent background and an opaque background in a simple manner.

In addition, it is provided that the object carrier unit be intended for active illumination. "Active illumination" is to be understood to mean, in particular, that the object carrier unit itself includes an illumination unit, and/or that viewed from the object data acquisition unit, an illumination unit is situated behind the object carrier unit and transilluminates it at least partially. The object carrier preferably includes at least one layer, such as a layer of opaque milk glass, which scatters the light issuing from the illumination unit diffusely. Preferably, the illumination unit may emit light in different colors. The illumination unit preferably has at least two illumination elements, which are separately controllable. In a further embodiment, the illumination unit may have a plurality of separately controllable illumination elements, which are distributed over a surface that at least partially surrounds the object measuring region. Illumination of the object may be advantageously adjusted by the embodiment of the acquisition device according to the present invention. In particular, using color adaptation, a contrast of the object carrier unit with an object resting on it may be maximized.

In addition, in accordance with an example embodiment of the present invention, it is provided that the object carrier unit include at least one light source. A light source is preferably situated on a side opposite to the object carrier wall. It is also possible for a light source to be set into the object carrier. Furthermore, it is provided that the object carrier unit include at least one light-emitting diode, in particular, at least one organic light-emitting diode. In particular, the at least one light-emitting diode is intended for allowing the object carrier unit to be illuminated uniformly, in particular, in different, adjustable colors. Illumination of the object may advantageously be adjusted by the embodiment of the acquisition device according to the present invention. In particular, using color adaptation, a contrast of the object carrier unit with an object resting on it may be maximized.

In addition, in accordance with an example embodiment of the present invention, it is provided that the acquisition device include at least one illumination unit, which is adjustable at least semiautomatically as a function of a parameter of an object and/or of the object data acquisition unit. The illumination unit is preferably adjustable at least semiautomatically as a function of a size, a surface finish, a geometric shape or further parameters of the object appearing useful to one skilled in the art, using, in particular, the, in particular, central, processing unit of the acquisition device or of a system including the acquisition device, or using a separate processing unit, in particular, a DMX controller, of the illumination unit. The illumination unit is preferably adjustable at least semiautomatically as a function of a focus, a focal length, a frame rate or further parameters of the object data acquisition unit appearing useful to one skilled in the art, using, in particular, the, in particular, central, processing unit of the acquisition device, or of a system containing the acquisition device, or using a separate processing unit, in particular, a DMX controller, of the illumination unit. For example, for alignment of a focus, a selection of apertures, as well as a setting of a sharpness of the object data acquisition unit, are acquired and calculated automatically from an upstream operation for measuring the object. It is also possible for the setting values for the illumination unit and/or for the object data acquisition unit to be taken from a database; their assignment being able to be accomplished manually or automatically. For example, by reading out machine-readable code situated on the object, it is possible for setting values for the illumination unit and/or the object data acquisition unit to be ascertainable from the database.

The illumination unit of the acquisition device is preferably configured in such a manner, that an object situated on the object carrier unit is illuminated from all sides, in particular, in order to illuminate the object uniformly. Alternatively, or in addition, it is possible for the illumination unit to be intended for illuminating an object situated on the object carrier unit indirectly or pointwise. Alternatively, or in addition, the illumination unit is intended for releasing an object situated on the object carrier unit as a result of colored illumination. For example, using an upstream color recognition operation, it is possible, in particular, for release, for a background positioned behind the object to be set to blue, green or another color with the aid of the illumination unit. The color recognition operation is preferably carried out by a camera system, in particular, by the object data acquisition unit or a mobile acquisition unit; in particular, a color content in an object being calculated and compared to a dimension of the object, in order to allow a suitable color selection for releasing the object. The illumination unit of the acquisition device preferably includes a plan view illumination unit and a front illumination unit. The plan-view illumination unit is preferably intended for illuminating an object situated on the object carrier unit from above. The front illumination unit is preferably intended for illuminating an object situated on the object carrier unit from the front, in particular, along its periphery. The plan-view illumination unit and/or the front illumination unit preferably includes at least one illumination panel, in particular, a plurality of illumination panels. The plan-view illumination unit and/or the front illumination unit preferably includes at least one illumination panel supported so as to be individually movable, in particular a plurality of illumination panels supported so as to be individually movable, in particular, in order to allow a light angle of the illumination unit relative to the object carrier unit to be set. The illumination panels of the top-view illumination unit and/or of the front illumination unit are preferably cascaded, in particular, connected in series and/or interlinked. The plan-view illumination unit and/or the front illumination unit is/are preferably controlled and/or regulated with the aid of the, in particular, central, processing unit of the acquisition device or of a system including the acquisition device. However, it is also possible for the plan-view illumination unit and/or the front illumination unit to include a separate processing unit, in particular, a DMX controller, for individual control and/or regulation of the illumination panel(s). Preferably, the illumination unit has, in particular, the plan-view illumination unit and/or the front illumination unit have, at least one, in particular, passive, cooling body. The cooling body is preferably formed in one piece with a support of the illumination panels, in particular, in the form of an extruded aluminum section. Other embodiments of the cooling body are possible, as well, such as an embodiment of the cooling body as an active cooling body, in particular, as a fluid cooling body (fan, water cooling body, etc.) or the like. At least a circuit board made of FR4 or a circuit board having an aluminum core of the illumination unit, in particular, of the plan-view illumination unit and/or of the front illumination unit, is preferably situated on the support, in particular, for controlling and/or holding individual illumination elements of the illumination unit. The circuit board is preferably fixed to the support with the aid of a force-locked, form-locked and/or continuous material connection, for example, with the aid of adhesive bonding by QPad® Gap Filler II, with the aid of a screw connection, or the like. The circuit board preferably has a top coating of paint, which corresponds to a bright color, in particular, white. The circuit board preferably includes at least one copper circuit trace, which has a cross section of at least 70 μm.

The illumination unit preferably includes illumination elements taking the form of an LED, in particular, LED chips of the manufacturers Nichia and Seoul. However, it is also possible for the illumination elements to have a different form appearing useful to one skilled in the art. Preferably, an RGB LED, such as a Nichia RGB chip NSSM124DT, and a white LED, such as a Seoul Sunlike chip STW9C2PB-SC, form, together, an illumination element of the illumination unit; the RGB LED and the white LED being positioned, in particular, together, on a common circuit board. Preferably, the illumination element has a color temperature of 5000 K and a color-rendering index of at least 95. The illumination elements or the illumination panels are preferably positioned uniformly in such a manner, that a low thermal resistance is attainable and/or a high heat dissipation is achievable. The illumination unit preferably includes at least one optical diffusor element. The optical diffusor element is preferably situated on the circuit board, in particular, on the illumination element. The optical diffusor element preferably has a maximum spacing of less than 50 mm, in particular, less than 30 mm, particularly preferably, less than 20 mm, and particularly preferably, less than 15 mm, relative to an upper surface of the circuit board or the illumination panel, in particular, in order to attain advantageous dispersion of the light from the illumination panels, and/or in order to prevent hotspots and aliasing at least as much as possible.

The illumination unit preferably includes, in particular, in addition, a background illumination unit, which preferably has at least one illumination panel, in particular, a plurality of illumination panels, which is/are formed, in particular, in a manner analogous to the illumination panel(s) of the plan-view illumination unit and/or of the front illumination unit. The illumination panel(s) of the background illumination unit is/are preferably positioned in a slight semicircle with a large diffusor disk. Preferably, the background illumination unit is individually controllable and/or regulatable with the aid of the, in particular, central, processing unit of the acquisition device or of a system containing the acquisition device. However, it is also possible for the background illumination unit to have a separate processing unit, in particular, a DMX controller, for individual control and/or regulation of the illumination panel(s).

Voltage is preferably supplied to the illumination unit by, in particular, six power supply units, such as power supply units HEP600-20, 20V/28A of the company Mean Well, which are individually distributed, in particular, over a six-channel DMX controller, such as a six-channel DMX controller 6CV10A-TS. However, it is also possible for voltage to be supplied to the illumination unit in a different manner appearing useful to one skilled in the art. The DMX controller is preferably intended for driving the illumination element at a repetition rate of greater than 70 Hz, in particular, in order to achieve flicker-free light output of the illumination element. Preferably, the illumination unit may be adapted automatically to parameters of the object data acquisition unit with the aid of the DMX controller or the processing unit, as a function of an embodiment of an object data acquisition unit, in particular, to adjust a setting of, for example, a repetition rate of the illumination unit to a repetition rate of the object data acquisition unit, in order to preferably prevent, at least as much as possible, an image error, such as flickering or flashing, during recording.

The DMX controller is preferably set to a maximum current limit of 10 A. Preferably, the DMX controller is individually adjusted and matched singly to each illumination panel, which belongs to the illumination unit and is connected to the DMX controller;

individual addressing preferably being stored in the C-bus system. All of the electronic components of the acquisition device preferably comply with DIN EN 61347-2-13-2017-10. In particular, the illumination unit is checked for photobiological safety in accordance with EN 62471. With the aid of the embodiment of the present invention, the illumination unit may be set individually as a function of a parameter of an object, in particular, in order to permit advantageous illumination of the object for precise acquisition of data of the object.

In addition, it is provided that the illumination unit include at least one subsurface illumination unit, which is at least partially situated on the object carrier unit. The subsurface illumination unit preferably forms the light source of the object carrier unit. The illumination unit preferably includes at least the subsurface illumination unit, which is integrated in the object carrier unit or is situated on the object carrier unit. The subsurface illumination unit is preferably intended for transilluminating the object carrier unit, in particular, in order to illuminate an object situated on the object carrier unit from below. However, it is also manually adjustable.

Preferably, the subsurface illumination unit is individually controllable and/or regulatable with the aid of the, in particular, central, processing unit of the acquisition device or of a system containing the acquisition device. However, it is also possible for the subsurface illumination unit to have a separate processing unit, in particular, a DMX controller, for individual control and/or regulation of the illumination panel(s). The subsurface illumination unit preferably includes illumination elements or illumination panels, which are formed in a manner analogous to the illumination elements or the illumination panels of the plan-view illumination unit and/or the front illumination unit. Preferably, the illumination elements are uniformly distributed on the object carrier unit as groups having, in particular, at least five illumination elements in a group. Heat dissipation of the subsurface illumination unit preferably takes place through the object carrier unit taking the form of, in particular, an aluminum platen, and/or via gap filler, in particular, without an active fan. The object carrier unit preferably has a multilayered construction. The object carrier unit preferably includes at least one dispersion cover and at least one object support, which includes, in particular, the major surface of extension. The dispersion cover and at least one object support are preferably made of a translucent material, in particular, an acrylic resin sheet composite, such as Opal S302 Hi Macs®. A surface of the translucent material is preferably ground. Together, the dispersion cover and the at least one object support form a maximum plate thickness of the object carrier unit of at least 12 mm. The major surface of extension of the object carrier unit preferably has a maximum spacing relative to the subsurface illumination unit, which is less than 50 mm, in particular, less than 40 mm, and particularly preferably, less than 30 mm, in particular, in an assembled state of the object carrier unit and the subsurface illumination unit. With the aid of the embodiment of the present invention, advantageous illumination of the object is rendered possible for precise acquisition of data of the object.

In addition, it is provided that the illumination unit be situated on the object carrier unit in the form of a grid, in particular, a latticed network. Preferably, a plurality of illumination elements of the illumination unit, in particular, of the subsurface illumination unit, are uniformly distributed on the object carrier unit. Individual illumination elements of the illumination unit, in particular, of the subsurface illumination unit, are preferably distributed uniformly in a line or row of a grid; further illumination elements of the illumination unit, in particular, of the subsurface illumination unit, of a further line or row of the grid, being positioned so as to be offset relative to the illumination elements of the line or the row of the grid. Further configurations of the illumination elements appearing useful to one skilled in the art are also possible, for example, a spiral-shaped configuration, a zigzag-type configuration, or the like. Advantageous illumination of an object on the object carrier unit may be attained with the aid of the embodiment of the present invention.

In addition, in accordance with an example embodiment of the present invention, it is provided that the object carrier unit include at least two detachably connected object carriers for transporting. In this connection, "detachable" should be understood as, in particular, "nondestructively separable." The object carrier unit preferably includes a counterpart complementary to the object carrier. In particular, in at least one operating state of the acquisition device, the object carrier and the complementary counterpart are joined in a form-locked and/or force-locked manner. For example, the object carrier and the complementary counterpart may be joined temporarily by a guide rail, a snap-in connection, a magnetic unit and/or a different connection appearing useful to one skilled in the art. It is also possible for the object carrier unit as a whole to be detachably connected to the bearing unit. Due to the embodiment of the acquisition device according to the present invention, an object carrier unit may be loaded with an object in an advantageously rapid and simple manner.

In accordance with an example embodiment of the present invention, it is further provided that the acquisition device include at least one transport unit, which is intended for conveying objects to an object measuring region in an at least semiautomated manner. "To convey in a semiautomated manner" is to be understood to mean, in particular, that an object is transported without manipulation from at least a starting point of the transport unit into the object measuring region. Transportation from the object measuring region to an endpoint of the transport unit preferably takes place without manipulation. A starting point is, in particular, a loading zone of the transport unit. An end point is, in particular, an unloading zone of the transport unit. An exchange of an object preferably takes place automatically in the object measuring region. In particular, the transport unit is controlled by the, in particular, central, processing unit. Using the embodiment of the acquisition device according to the present invention, multiple sets of object data of a plurality of objects may be acquired in an advantageously rapid manner.

In addition, in accordance with an example embodiment of the present invention, it is provide that the transport unit include a path conveyor unit, in particular, a conveyor belt unit. Other embodiments of the path conveyor unit are also possible, for example, a roller conveyor. Alternatively, the transport unit may take the form of an autonomous floor conveyor unit or a robot arm. Using the embodiment of the acquisition device according to the present invention, a large number of objects may be fed to the object measuring region advantageously rapidly.

Furthermore, in accordance with an example embodiment of the present invention, it is provided that the transport unit include a positioning unit, in order to position an object, in particular, down from the path conveyor unit or a preparation unit, such as a processing table or the like, in an object measuring region. In particular, the positioning unit takes the form of a drawer, gripping arm and/or magnetic arm, as a multi-axis robot arm, or the like. In particular, the positioning unit is intended for placing an object carrier, which has an object situated on it, in particular, down from the path conveyor unit or a preparation unit, such as a processing table or the like, into the object measuring region. In particular, the positioning unit is intended for supplying the object carrier to the complementary counterpart of the object carrier unit and/or to the bearing unit. Using the embodiment of the acquisition device according to the present invention, an automatically transported object may advantageously be positioned in the object measuring region in a reliable manner.

In addition, in accordance with an example embodiment of the present invention, it is provided that the acquisition device include at least one object carrier unit, which has at least one detachably connected object carrier; the transport unit being intended for transporting at least two detachably connected object carriers of the object carrier unit. The object carrier unit preferably includes at least ten object carriers. The embodiment of the acquisition device according to the present invention may advantageously allow an idle time of the acquisition device, due to a loading and unloading time of the transport unit, to be minimized in an advantageous manner.

Furthermore, in accordance with an example embodiment of the present invention, a housing unit is provided, which is intended for shielding an object measuring region at least partially from the outside. The object data acquisition unit and the movement device are preferably situated at least partially in an interior chamber defined by the housing unit. The housing unit is intended, in particular, for protecting the interior chamber from dust. The housing unit preferably shields the interior chamber from electromagnetic radiation. The housing unit preferably includes an, in particular, a single, opening for positioning an object in the object measuring region. The housing unit preferably includes a sealing unit for, in particular, automatically closing and opening the opening. Alternatively, the housing includes two openings for setting up a path conveyor unit through the housing. The housing preferably has a window onto the object measuring region. The housing preferably includes an indicating unit, in particular, a display. The indicating unit is intended, in particular, for displaying at least one element of a set of multiple object data for a check. The embodiment of the acquisition device according to the present invention may allow the acquisition device to be operated in a dusty environment, in particular, in factory buildings and/or warehouses.

In addition, an anti-contamination unit is provided, which is intended for at least reducing contamination of an object measuring region and/or of a region of an object data acquisition unit, in particular, inside the housing unit. An "anti-contamination unit" is to be understood as, in particular, a unit, which at least reduces the number of particles, in particular, dust, in a delimited region and/or keeps them from penetrating into the region. The anti-contamination unit may include, for example, a fan, which generates a constant air stream out of the region to be protected. Preferably, a fan circulates air situated in the working area of the fan, in order to generate an air current. However, it is also possible for the fan to direct a, in particular, pure, gas, such as nitrogen, out of a supply unit. Alternatively, or in addition, the anti-contamination unit may include an electrostatic unit, in particular, an ionizer, in order to reduce adhesion of particles to a surface. The example embodiment of the acquisition device according to the present invention may allow the acquisition device to be operated in a dusty environment, in particular, in factory buildings and/or warehouses.

In addition, in accordance with an example embodiment of the present invention, it is provided that the anti-contamination unit be intended for generating a pressure above atmospheric inside the housing unit. A pressure above atmospheric is preferably attained by circulating filtered air from the surrounding area of the housing unit. Alternatively, a, in particular, pure, gas from a supply unit is let into the housing unit. Using the embodiment of the acquisition device according to the present invention, a gas stream out of the housing unit may be attained.

Furthermore, in accordance with an example embodiment of the present invention, a treatment unit is provided, which is intended for treating, in particular, for cleaning, at least one object prior to acquisition of a set of object data.

In addition, in accordance with an example embodiment of the present invention, it is provided that the treatment unit include a lock chamber unit. A lock chamber unit is to be understood, in particular, as a substructure of the housing unit, which is delimited from the object measuring region, and through which an object must pass for placement in the object measuring region. The substructure preferably has a delimiting unit at a transition to the object measuring region. The delimiting unit may include, for example, an automatically controlled sliding door or a curtain made of elastic, mounted, plastic lamellae. The lock chamber unit preferably includes a further delimiting unit on an outer side of the substructure; the further delimiting unit being intended for bringing an object into the lock chamber unit and/or taking it out of it. At least in one regular operating state of the acquisition device, the embodiment of the acquisition device according to the present invention allows a direct connection of the object measuring region to the air surrounding the housing unit to be prevented.

In addition, in accordance with an example embodiment of the present invention, it is provided that the treatment unit include a fluid control unit for controlling and/or regulating a fluid stream. In particular, a fluid control unit may include a fan, a gas nozzle and/or a liquid nozzle. In particular, the fluid control unit is mounted to an outer wall of the housing unit. The fluid control unit is preferably situated around the opening of the housing unit. The fluid control unit preferably generates a fluid stream, which is directed away from the opening.

A fluid control unit is preferably positioned in the lock chamber unit. Contamination of an object moved into the housing unit may be reduced by the embodiment of the acquisition device according to the present invention.

In addition, in accordance with an example embodiment of the present invention, it is provided that the acquisition device include at least one contrast unit, which is intended for active illumination, in particular, for illumination with the aid of an illumination unit of the acquisition device. A contrast unit is to be understood as, in particular, a unit, which, as viewed from the object data acquisition unit, is situated behind the object measuring region and provides a uniform background during measuring of the object. The contrast unit may have a curvature or may be planar. In at least one operating state of the acquisition device, the contrast unit is preferably situated directly on the object carrier unit. However, it is also possible for the contrast unit to be supported so as to be movable relative to the object carrier unit, in particular, supported so as to be movable together with the object data acquisition unit or relative to the object carrier unit and relative to the object data acquisition unit. "Active illumination" is to be understood to mean, in particular, that the contrast unit itself includes an illumination unit, and/or that viewed from the object data acquisition unit, an illumination unit of the acquisition device is situated behind the contrast unit and at least partially transilluminates it. The contrast unit preferably includes at least one layer, which diffusely scatters the light emanating from the illumination unit. Preferably, the illumination unit may emit light in different colors. The illumination unit preferably has at least two illumination elements, which are separately controllable.

Preferably, the illumination unit may generate continuous light and/or flashing light. Alternatively, viewed from the contrast unit, an illumination unit is positioned opposite to the object carrier unit, in particular, on the guide unit for the object data acquisition unit. In a further refinement of the present invention, the object measuring region could be surrounded by an illumination unit of the acquisition device substantially completely. "To surround substantially completely" is to be understood to mean, in particular, that when the illumination unit is situated on an upper surface of a possible three-dimensional body, which surrounds at least the object measuring region completely, the illumination unit covers at least 50%, preferably, more than 75%, of the upper surface. In particular, single, individually controllable illumination elements that are, in particular, spaced apart from each other, could also be situated on an upper surface of a possible, three-dimensional body, in an irregular or regular, in particular, grid-shaped pattern; the possible, three-dimensional body completely surrounding at least the object measuring region. A subsurface of the upper surface, which results from a projection of a circular surface onto the upper surface, and on which no illumination element is situated, is preferably at least less than 50%, preferably, less than 25%. Illumination of the object may advantageously be adjusted by the embodiment of the acquisition device according to the present invention. In particular, using color adaptation, a contrast of the contrast unit with an object resting on the object carrier unit may be maximized.

In addition, in accordance with an example embodiment of the present invention, it is provided that the acquisition device include at least one, in particular, the above-mentioned, contrast unit, which has at least one light source, in particular, the background illumination unit. A light source is preferably attached to the side of the contrast unit facing away from the object carrier unit. It is also possible for a light source to be set into the contrast unit. Furthermore, a contrast unit is provided, which includes at least one light-emitting diode, in particular, at least one organic light-emitting diode. In particular, the at least one light-emitting diode is intended for allowing the contrast unit to be illuminated uniformly, in particular, in different, adjustable colors. Illumination of the object may advantageously be adjusted by the embodiment of the acquisition device according to the present invention. In particular, using color adaptation, a contrast of the contrast unit with an object resting on the object carrier unit may be maximized.

Furthermore, in accordance with an example embodiment of the present invention, it is provided that the acquisition device include at least one, in particular, the above-mentioned, contrast unit; the movement device including a drive unit for automated movement of the contrast unit. In particular, the drive unit is intended for moving the contrast unit on a path of motion around the object acquisition region. Preferably, the path of motion of the contrast unit is continuously joined to the path of motion of the object data acquisition unit. Alternatively, at least sections of the path of motion of the contrast unit run substantially parallelly to a path of motion of the object data acquisition unit. In this case, "substantially parallelly" is to be understood as, in particular, an orientation of a direction relative to a reference direction, in particular, in a plane; the direction deviating from the reference direction by, in particular, less than 8°, advantageously, less than 5°, and particularly advantageously, less than 2°. It is also possible for the path of motion of the contrast unit to be designed to be independent of the path of motion of the object data acquisition unit. In particular, "automated" is to be understood to mean that the drive unit is controlled and/or regulated by a, in particular, central, processing unit. In particular, the processing unit controls and/or regulates the drive unit in light of a list of perspectives, which are determined, in particular, beforehand, and from which the object is intended to be measured. The example embodiment of the acquisition device according to the present invention many advantageously allow a background to be adapted, in particular, to a position of the object data acquisition unit.

In addition, in accordance with an example embodiment of the present invention, it is provided that the acquisition device include the object data acquisition device and at least one, in particular, the above-mentioned, contrast unit; the movement device including a movement unit, which is intended for simultaneously moving the contrast unit and the object data acquisition unit. "To move simultaneously" is to be understood to mean, in particular, that at least after completion of the movement, the contrast unit and the object data acquisition unit have the same relative position and the same relative orientation with respect to each other as prior to the movement. The movement of the contrast unit and the movement of the object data acquisition unit may take place simultaneously or may be carried out one after the other. It is also possible for the same relative position and the same relative orientation with respect to each other to be maintained during the entire movement. In particular, the contrast unit and the object data acquisition unit have a common swivel axis and/or axis of rotation, about which the object data acquisition unit and the contrast unit are pivoted and/or rotationally mounted. It is possible for the movement unit to take the form of a multi-axis robot arm, on which the object data acquisition unit and the contrast unit are positioned together. However, it is also possible for the movement unit to include at least one multi-axis robot arm for the object data acquisition unit and a further multi-axis robot arm for the contrast unit. Furthermore, it is also possible for the movement unit to take the form of a rail unit, on which the object data acquisition unit and the contrast unit are positioned together. The object data acquisition unit and the contrast unit may be situated together on a single moving part of the movement unit, for example, on a movably supported guide block, or the object data acquisition unit and the contrast unit may each be situated on a separate moving part of the movement unit, for example, in each instance, on a separate guide block. Further embodiments and/or set-ups of the contrast unit appearing useful to one skilled in the art are possible, as well. Through the embodiment of the acquisition device according to the present invention, a uniform background may advantageously be provided independently of the relative position of the object and the object data acquisition unit.

In addition, in accordance with an example embodiment of the present invention, it is provided that the acquisition device include the object data acquisition device and at least one, in particular, the above-mentioned, contrast unit; the movement unit including a structural element, which, in at least one operating state, interconnects the contrast unit and the object data acquisition unit substantially rigidly. "Substantially rigidly" is to be understood to mean, in particular, that a relative position and a relative orientation of the contrast unit and the object data acquisition unit with respect to each other are retained at least while a force is applied by the drive unit and/or while a torque is applied by the drive unit. The structural element preferably takes the form of a common guide block. Alternatively, or in addition, the structural element includes at least one, preferably two, coupling rods, which interconnect the movement unit of the object data acquisition unit and the movement unit of the contrast unit. The embodiment of the acquisition device according to the present invention may advantageously ensure, in a simple and reliable manner, that the contrast unit and the object data unit move simultaneously with respect to each other.

In addition, in accordance with an example embodiment of the present invention, a control and/or regulating unit is provided, which is intended for setting at least one operating parameter of the acquisition device as a function of at least one object parameter. In particular, using the operating parameters, the control and/or regulating unit is intended for individually and continuously adjusting all of the sequences of movements to each other, which are allowed by the movement device. An object parameter is, in particular, an individual information item regarding an object and/or an instruction for an object. This information item and/or instruction may be a function of the object itself and/or conditional upon the situation. An object parameter may take the form of, for example, a maximum extension of the object, a weight, a relative configuration on the object carrier unit, and/or a degree of contamination. An operating parameter of the acquisition device includes, for example, the perspectives to be used, the number of object data, which a set of multiple object data includes, the rotational speed of the object carrier unit, the activation of the treatment unit, the speed of the transport unit, the power of an air compressor, and/or another parameter appearing useful to one skilled in the art, which may be adapted for reliably acquiring a set of multiple object data. The embodiment of the acquisition device according to the present invention may advantageously allow reliable acquisition of a set of multiple object data to be achieved. In particular, the acquisition device may be adapted rapidly and reliably to objects having different object parameters.

In addition, in accordance with an example embodiment of the present invention, an identification unit for acquiring at least one object parameter in advance is provided. The identification unit preferably includes a scanning unit for reading in an object parameter. The object parameter preferably takes the form of a unique identification number, such as an EAN. The identification number is preferably stored in an identification element, for example, in the form of a bar code, QR code and/or RFID tag. The identification number is preferably read in during the loading of the transport unit and/or during positioning of the object in the object measuring region. With the aid of the identification number, further object parameters, such as dimensions and/or weight, may preferably be retrieved from a database. The identification number is preferably injective. As an alternative, the identification number associates an object with a particular category of objects having similar, further object parameters. The scanning unit is preferably a handheld scanner. In a further refinement of the present invention, the scanning unit could also be integrated in the object carrier, the transport unit and/or the lock chamber unit, in particular, for automated acquisition of an object parameter. The identification element is preferably situated on the object and/or integrated in the object. However, it is also possible for the identification feature to be positioned so as to be spatially separated from the object, for example, packaging and/or a data sheet. The embodiment of the acquisition device according to the present invention may allow operating parameters of the acquisition device to be adjusted rapidly to different objects. It is advantageous that acquired sets of multiple object data may be assigned reliably to an object.

In addition, in accordance with an example embodiment of the present invention, an identification unit for acquiring at least one object carrier parameter in advance is provided. The identification unit preferably includes a scanning unit for reading in an object carrier parameter. The object carrier parameter preferably takes the form of a unique identification number. The identification number is preferably stored in an identification element, for example, in the form of a bar code, QR code and/or RFID tag. The identification number is preferably read in during the loading of the transport unit and/or during positioning of the object on the object carrier. The identification unit preferably includes a further scanning unit for reading in the identification number immediately prior to positioning the object carrier in the object measuring region. The identification number is preferably injective. It is, in particular, serial numbering. The scanning unit is preferably a handheld scanner. The further scanning unit is preferably designed to be automated. The example embodiment of the acquisition device according to the present invention may allow operating parameters of the acquisition device to be adapted rapidly to different object carriers.

In addition, in accordance with an example embodiment of the present invention, it is provided that the identification unit be intended for evaluating an object carrier parameter with regard to an object parameter. The identification unit preferably includes a scanning unit, which allows both an object parameter, in particular, an identification number, and an object carrier parameter, in particular, an identification number, to be read in. In the identification unit, an object carrier parameter is preferably assigned to an object in light of an object parameter. Preferably, with the aid of the object carrier parameter, further object parameters, such as dimensions and/or weight, may preferably be retrieved from a database. In particular, in the case of objects having very different object parameters, acquisition of object parameters in advance may be ensured in a simple manner by the embodiment of the acquisition device according to the present invention.

Furthermore, in accordance with an example embodiment of the present invention, a communications device for receiving object parameters is provided. In particular, the acquisition device includes an interface for communication with storage and/or logistics software, in order to receive and/or compare object parameters rapidly and reliably. Faulty assignments may be detected by the example embodiment of the acquisition device according to the present invention.

In addition, in accordance with an example embodiment of the present invention, it is provided that the object carrier unit include a weight measuring unit. A "weight measuring unit" is to be understood as, in particular, a unit, which may measure at least a weight, preferably, a mass, of an object. For example, the weight measuring unit may be set into the object carrier in the form of a pressure plate. Alternatively, the weight measuring unit measures a weight, using the forces and/or torques on the bearing unit. Through the example embodiment of the acquisition device according to the present invention, a set of multiple object data may also contain an information item about the weight of the measured object.

In addition, in accordance with an example embodiment of the present invention, a dimension measuring unit is provided. A "dimension measuring unit" is to be understood as, in particular, a unit, which may measure at least an extension of an object. The dimension measuring unit preferably includes a movably supported laser module for a time-of-flight measurement. In this context, the laser module may be connected to the movement unit of the object data acquisition unit and/or of the contrast unit, in a form-locked and/or force-locked manner. Alternatively, the movement device includes a laser-module movement unit for moving the laser module independently of the object data acquisition unit. The laser-module movement unit preferably includes a guide block. The guide block is preferably situated on the guide unit of the object data acquisition device and/or on the guide unit of the contrast unit. Alternatively, the laser-module movement unit has a path of motion independent of the object data acquisition device and/or of the contrast unit. In an alternative embodiment, an extension of an object is calculated by a processing unit with the aid of the set of multiple object data acquired by the object data acquisition unit and movement data of the object carrier unit, in particular, a rotational speed, using a structure-from-motion method. It is also possible for the "dimension measuring unit" to include an illumination unit and a detection unit, in order to obtain an extension from a transmitted-light and/or incident-light method. It is also possible for a plurality of methods to be combined with each other. Through the example embodiment of the acquisition device according to the present invention, a set of multiple object data may also contain an information item about the dimensions of the measured object.

In addition, in accordance with an example embodiment of the present invention, a penetrating-radiation unit, in particular, an x-ray unit, is provided, which is intended for transmitting radiation at least partially through at least one object. The penetrating-radiation unit preferably includes at least one x-ray unit and an x-ray screen. Alternatively, and/or in addition, the penetrating-radiation unit includes an ultrasonic unit. In this context, the penetrating-radiation unit may be connected to the movement unit of the object data acquisition unit and/or of the contrast unit, in a form-locked and/or force-locked manner. As an alternative, the movement device includes a penetrating-radiation movement unit for moving the penetrating-radiation unit independently of the object data acquisition unit and/or of the contrast unit. The penetrating-radiation movement unit preferably includes a guide block. The guide block is preferably situated on the guide unit of the object data acquisition device and/or on the guide unit of the contrast unit. Alternatively, the penetrating-radiation movement unit has a path of motion independent of the object data acquisition device and/or of the contrast unit. It is also possible for the penetrating-radiation movement unit to be stationary. The example embodiment of the acquisition device according to the present invention may allow a set of multiple object data to also contain an information item about the internal structure of an object. In particular, it may be discerned whether the object is hollow or solid. Using data about the dimensions, a density may additionally be deduced.

Further provided, in accordance with an example embodiment of the present invention, is a system having an acquisition device according to the present invention; having a storage unit that includes data sets at least partially generated by the acquisition device; and having a mobile acquisition unit; as well as having a processing unit, which is intended for evaluating data acquired by the mobile acquisition unit in view of at least the storage unit. The storage unit is preferably intended for storing sets of multiple object data at least temporarily. The sets of object data of measured objects, generated by the system or by the acquisition device, preferably include data with regard to an adjusted setting of the acquisition device during the acquisition, a dimension of the object, a weight of the object, a bounding box of the object, a volume model of the object, 3-D data of the object, color profiling of the acquisition device, or further data appearing useful to one skilled in the art. The sets of object data of measured objects are preferably stored as so-called metadata, in particular, in accordance with Exif (exchangeable image file format), in the image files of the measured objects. However, it is also possible for the sets of object data of measured objects to be stored in a different manner, such as in a separate file format, as an electronic watermark, separately from the image file in a database or the like.

It is particularly preferable for the storage unit to be intended for storing data sets, which have been generated at least partially by the acquisition device. The storage unit is preferably formed so as to be spatially separate from the acquisition device. The processing unit is intended for executing an object learning operation. An "object learning operation" is to be understood as, in particular, processing of the sets of multiple object data for an additional application. For example, an object learning operation may include the generation of a panoramic view of the object, the generation of a three-dimensional model of the object and/or the extraction of characteristic features, in particular, to allow pattern recognition. The sets of multiple data generated by the acquisition device are preferably processed to form sets of data, which have been generated at least partially by the acquisition device. "Generated at least partially by the acquisition device" is to be understood to mean, in particular, that at least one further information item is utilized for processing a set of multiple data. The further information item is preferably a further set of multiple data of a further object, which, with regard to at least a type of object data, may be put in the same category as the object. A "mobile acquisition unit" is to be understood to mean that, in particular, in a provided operating state, the mobile acquisition unit is portable by hand, in particular, operable independent of location. Preferably, the mobile input unit may be worn by a person directly or indirectly on the body, for example, as an armband and/or in a pocket of a piece of clothing. For example, the mobile input unit may take the form of a smartphone, tablet, smartwatch, and/or as a peripheral head-mounted display (PHMD). The mobile acquisition unit is intended, in particular, for acquiring object data. In addition, the mobile input unit includes a communications unit for communication with the processing unit. The processing unit is intended for identifying the object with the aid of the object data acquired by the mobile acquisition unit, in view of the data sets stored in the storage unit. It is also possible for the processing unit to be intended for identifying the object with the aid of the sets of multiple object data acquired by the acquisition device, in view of the data sets stored in the storage unit. Using the embodiment of the system according to the present invention, a database may be generated, which allows an object to be identified by simple devices. In particular, additional data regarding the object may be retrieved immediately.

Further provided, in accordance with an example embodiment of the present invention, is a method for acquiring sets of multiple object data of the at least one object, using an acquisition device of the present invention and/or a system of the present invention.

In addition, in accordance with an example embodiment of the present invention, it is provided that in at least one method step of the method of the present invention, at least one parameter of an illumination unit of the acquisition device be set at least semiautomatically as a function of at least one acquired parameter of an object. In addition, it is provided that in at least one method step of the method of the present invention, at least one parameter of an illumination unit of the acquisition device be set at least semiautomatically as a function of at least one parameter of the object data acquisition unit.

In at least one method step of the method of the present invention, at least one parameter, in particular, a weight, a dimension, or the like, of the object is advantageously measured with the aid of a transport unit of the acquisition device. The transport unit preferably includes at least one sensor unit for measuring a parameter, in particular, a weight, a dimension, or the like, of the object, in particular, by evaluating a change in a capacitance, a resistance or a voltage due to an object's acting upon a sensor surface of the sensor unit. However, it is also possible for the acquisition device or the system including the acquisition device to have one or more scales, with the aid of which at least one parameter taking the form of a weight is measurable. The one or more scales is/are preferably connected to the processing unit so as to be able to at least transfer data. The sensor unit preferably includes a configuration of electrically conductive elements in the form of a latticed network or grid, as well as the elastomer layers enveloping or covering the electrically conductive elements positioned in the form of a latticed network or grid. The conductive elements of the sensor unit are preferably connected electrically to a control and/or regulating unit of the acquisition device. An embodiment of the sensor unit is described in German Patent application No. DE 10 2010 034 717 A1, so that with regard to further features of the sensor unit, reference is made, in particular, to German Patent Application No. DE 10 2010 034 717 A1. However, it is also possible for the sensor unit to have a different form, which appears useful to one skilled in the art and allows detection of a contact surface, of an approach, and/or of a force parameter by a sensor surface. The sensor unit is preferably elastically deformable. The sensor unit is preferably designed in such a manner, that elastic deformation of the sensor unit allows a measurement of a force parameter. Detection of an object's approach of the sensor surface of the sensor unit is preferably accomplished with the aid of an evaluation of a change in a capacitance by the control and/or regulating unit. A measurement of a force parameter from an object acting upon the sensor surface of the sensor unit is preferably carried out, by evaluating a change in a capacitance, a resistance or a voltage. The sensor unit is preferably foil-like. The sensor unit preferably has a maximum material thickness of, in particular, less than 20 mm, preferably, less than 10 mm, and particularly preferably, less than 5 mm. The maximum material thickness of the sensor unit is preferably formed by a maximum dimension, in particular, a maximum diameter, of the electrically conductive elements of the sensor unit, together with a maximum dimension, in particular, a maximum material thickness, of the elastomer layers of the sensor unit, in particular, in an interconnected state of the electrically conductive elements and the elastomer layers.

For example, at least a focal length, a focus, an exposure time, a zoom, a distance relative to the object, or other parameters of the object data acquisition unit appearing useful to one skilled in the art may be set at least semiautomatically, in particular, automatically, by the control and/or regulating unit of the acquisition device, as a function of the measured parameter of the object. In at least one method step, the object to be measured is preferably measured automatically, for example, with the aid of the sensor unit, with the aid of a mechanical measuring unit of the acquisition device, with the aid of an evaluation of images recorded by the object data acquisition unit, or the like, in particular, before the object is conveyed to the object measuring region. In an evaluation of images recorded by the object data acquisition unit, in at least one method step, it is possible for an image of the object having a predefined zoom to be acquired by the object data acquisition unit, in particular, from above, and/or at a predefined distance from the object, and with a predefined focus; in particular, the settings of the illumination unit being predefined, as well. In at least one method step, in particular, in a method step following the acquisition of the image of the object, the acquired image of the object is preferably compared to a reference image. In at least one method step, a digital, right parallelepiped or a digital cylinder, such as a so-called bounding cylinder or a so-called bounding box, which corresponds to the smallest right parallelepiped or cylinder that only just encloses the digital image of the object completely, is generated and placed around the object. In at least one method step, starting out from the digital, right parallelepiped or the digital cylinder, a dimension of the object is preferably calculated automatically, in particular, in view of the predefined, in particular, above-mentioned parameters of the object data acquisition unit. However, it is also possible for a reflected light method to be used for determining dimensions of the object. For different dimensions of an object, different parameter settings for the object data acquisition unit are preferably stored in the storage unit of the acquisition device. As a function of a calculated or acquired dimension of an object, a parameter setting for it may advantageously be selected automatically for the object data acquisition unit. However, it is also possible for an individual parameter setting for the object data acquisition unit to be calculated automatically by a mathematical model as a function of a calculated or measured dimension of an object. A focal length, a zoom, an inclination and a spatial position of the object data acquisition unit within the object measuring region are advantageously taken into account in the mathematical model. For example, the following functional relationships are possible:

Zoom System: f(h, d)→z(zoom), l(focal length), t(inclination)

Robot System: f(h, d)→x,y,z(position), l(focal length), t(inclination)

In at least one method step of the example method of the present invention, a surface finish of an object to be measured is taken into account to set parameters for the object data acquisition unit in an at least semiautomated manner. In the storage unit of the acquisition device, it is possible for, in particular, four standard parameter settings to be stored for the measuring of objects, for example, a standard parameter setting "matte" for objects having a matte, dark, upper surface that has a low reflectance, a standard parameter setting "semi-matte" for objects having a slightly glossy, upper surface that reflects the light partially, a standard parameter setting "metallic" for objects having a glossy, upper surface that has a high reflectance, and a standard parameter setting "white" for objects having a white, upper surface that has a high reflectance. The standard parameter settings preferably include different parameter values for, e.g., a light intensity of the illumination unit, a color of the illumination unit (RGB value), photosensitivity, zoom, inclination, focal length, activation time, or the like, of the object data acquisition unit. It is also possible for the acquisition device to include an input unit, with the aid of which an operator may edit the standard parameter settings individually. For example, an application of the standard parameter settings proceeds as follows:

At the start of processing, an image of an object from above is advantageously generated at a standard zoom and focus of the object data acquisition unit, as well as at standardized settings of the illumination unit. Preferably, the image of the object is subsequently compared, in particular, automatically, to a reference image. White portions in the image, as well as overexposed or underexposed portions in the image, are preferably assessed. In particular, as a result of an automatic comparison of color profiles and the overexposed or underexposed portions, automatic placement in the four above-mentioned categories of standard parameter settings is carried out. The automatic selection is preferably indicated to a user, so that he/she has the option of using it or changing it.

With the aid of the example embodiment of the present invention, a high degree of automation may be achieved in an advantageous manner. Standardized measurement of objects and the resulting generation of data sets may advantageously be designed to be carried out in a uniform manner. Data regarding the object may simply be acquired, which may advantageously be taken into account for adjusting the acquisition device.

In accordance with an example embodiment of the present invention, in at least one method step, at least semiautomated measurement error identification is preferably carried out. In at least one method step, an acquired image of an object is preferably compared to a reference image, in particular, automatically. Preferably, the parameter settings of the object data acquisition unit and/or of the illumination unit are automatically checked as a function of the detection of differences between the acquired image and the reference image. In particular, it is possible for an operator to be given an optical and/or acoustic indication, in particular, by an output unit of the acquisition device, as a function of the detection of differences between the acquired image and the reference image. An operator is preferably given an optical and/or acoustic instruction for action, such as an instruction to clean a lens of the object data acquisition unit, the illumination unit, and/or the object carrier unit, to manually approach a position of the object data acquisition unit, to check a position of an object to be measured, relative to the object carrier unit, or the like. The example embodiment of the present invention may advantageously allow images of objects to be recorded in a reliable and precise manner.

Moreover, in accordance with an example embodiment of the present invention, a method utilizing an acquisition device according to the present invention and/or a system according to the present invention is provided, in which in at least one method step, at least one set of multiple data is ascertained during a return movement of the movement device back to a starting position of the movement device, after a forward movement. The movement device and the object data acquisition unit are preferably controlled and/or regulated by a, in particular, central, processing unit. In particular, the processing unit controls and/or regulates the defined, relative movement and at least the acquisition time of the object data acquisition unit. The movement device preferably has a defined starting position, from which a defined, relative movement starts. A "forward movement" is to be understood as, in particular, a movement, which leads away from the starting position. A "return movement" is to be understood as, in particular, a movement, which leads to the starting position. A return movement may be carried out by reversing the path of motion during a forward movement, or by moving further along a closed path of motion. The embodiment of the method according to the present invention may allow an idle time of the machine, for restoring the starting position of the movement device between two acquisitions of different sets of multiple object data, to be minimized in an advantageous manner.

In addition, a method utilizing an acquisition device of the present invention and/or a system of the present invention is proposed, in which in at least one method step, a material is deduced from at least one data set. Preferably, the processing unit deduces a material from at least the color and weight of the object, by comparison with a database. For identifying a material, dimensions of the object are preferably utilized, in particular, an information item regarding the density. It is possible for further data regarding a material of the object to be ascertained, using, for example, laser spectroscopy. In particular, objects appearing identical may be distinguished from each other by the example embodiment of the method according to the present invention.

In addition, in accordance with an example embodiment of the present invention, a method utilizing a system according to the present invention is provided, in which in an at least one method step, the generated sets of object data are evaluated for machine learning, in particular, by a neural network. Furthermore, in accordance with an example embodiment of the present invention, a method utilizing a system according to the present invention is provided, in which in an at least one method step, the generated sets of object data are evaluated for identifying the object. In addition, in accordance with an example embodiment of the present invention, a method utilizing a system according to the present invention is provided, in which in an at least one method step, the data acquired by the mobile acquisition unit are evaluated for identifying the object. Using the embodiment of the method according to the present invention, in particular, a measured object may be identified rapidly and reliably.

In this connection, the acquisition device of the present invention, the system of the present invention, and/or the method of the present invention shall not be limited to the use and specific embodiment described above. In particular, in order to achieve a functionality described here, the acquisition device of the present invention, the system of the present invention, and/or the method of the present invention may have a number of individual elements, component parts and units, as well as method steps, different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages are derived from the description of the figures that follows. Seven exemplary embodiments of the present invention are shown in the figures. The figures and the description herein include numerous features in combination. One skilled in the art will necessarily consider the features individually, as well, and unite them to form useful, further combinations.

DETAILED DESCRIPTION OF EXAMPLE EMBODIMENTS

Figure 1:
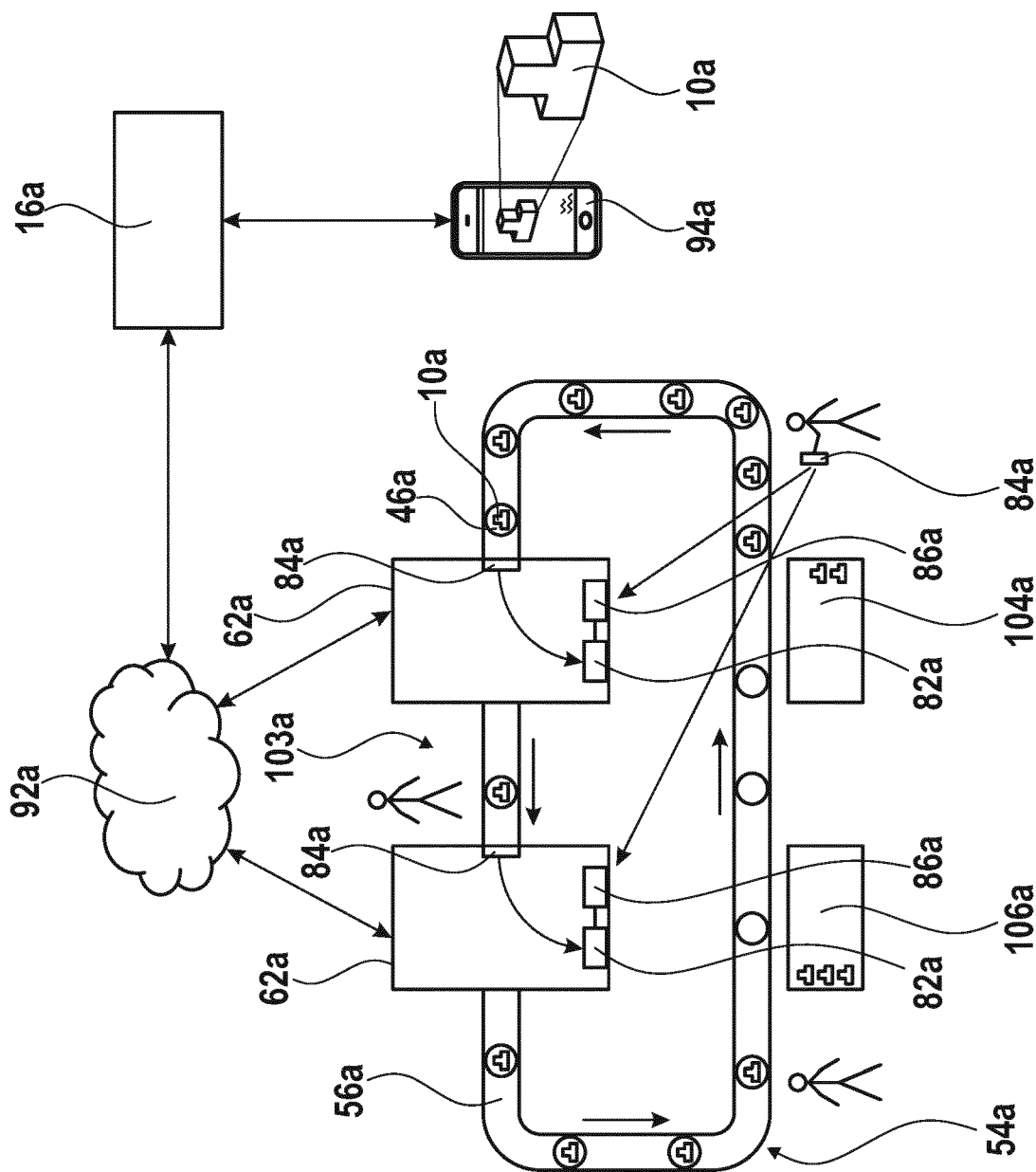
FIG. 1 shows a schematic representation of the system according to the present invention, for nontransparent object carriers.

FIG. 1 shows a system including an acquisition device, having a storage unit 92a that has data sets at least partially generated by the acquisition device, and having a mobile acquisition unit 94a, as well as having a processing unit 16a which is intended for evaluating data acquired by mobile acquisition unit 94a in view of at least the storage unit 92a. The acquisition device includes a processing unit 16a, which is intended for carrying out an object learning operation.

The acquisition device includes a housing unit 62a, which is intended for shielding an object measuring region at least partially from the outside. The acquisition device includes a transport unit 54a, which is intended for feeding objects 10a to the object measuring region in an at least semiautomated manner. Transport unit 54a includes a path conveyor unit 56a, in particular, a conveyor belt unit. Transport unit 54a is intended for transporting at least two detachably connected object carriers 46a. Transport unit 54a preferably transports a plurality of object carriers 46a, although a number of object carriers 46a shown is preferably just illustrative. In particular, in a loading region 104a, object carriers 46a are each loaded with one object 10a. After being measured in object measuring regions surrounded by housing units 62a, objects 10a are preferably removed from object carriers 46a in an unloading region 106a. For example, the loading and/or unloading takes place manually, such as by a worker, in particular. In one further refinement, the loading and/or unloading of transport unit 54a may also be accomplished automatically, in particular, with the aid of a logistics and conveyance unit, such as with the aid of a robot.

The acquisition device includes an identification unit 84a for acquiring object parameters in advance. The acquisition device includes an identification unit 84a for acquiring object parameters in advance. In particular, identification unit 84a includes, in each instance, a scanning unit, which is situated on housing units 62a. Identification unit 84a preferably includes a mobile scanning unit. The mobile scanning unit is intended, in particular, for acquiring both an object parameter and an object carrier parameter. In particular, the mobile scanning unit reads in an identification number of object carrier 46a in response to the loading of object carrier 46a. Subsequently, and/or beforehand, the mobile scanning unit preferably reads in an identification number of object 10a. However, it would also be possible for an identification number of object 10a to be assigned manually to the one identification number of object carrier 46a, and to merely be checked by the scanning unit. Object parameters are preferably extracted from an internal and/or external database in light of the identification number of object 10a. The acquisition device includes a communications device 86a for receiving object parameters. In addition to the object parameters, communications device 86a receives, in particular, the identification number of the object carrier 46a, which carries corresponding object 10a. After the identification numbers are read in, path conveyor unit 56a preferably transports object 10a on object carrier 46a to the first object data acquisition region. Identification unit 84a is intended for evaluating an object carrier parameter with regard to an object parameter. In particular, the scanning unit situated on housing unit 62a acquires the identification number of object carrier 46a upon entry into the interior chamber of housing unit 62a. In particular, the object parameters received by communications device 86a are selected in view of the identification number of object carrier 46a. The acquisition device includes a control and/or regulating unit 82a, which is intended for setting at least one operating parameter of the acquisition device as a function of at least one object parameter.

In one embodiment having nontransparent object carriers 46a, in order to measure the side, facing object carrier 46a, of an object 10a resting on object carrier 46a, must be turned 103a at least once. In order to achieve higher throughputs, the system includes a further object measuring region, which is intended for generating an additional measurement of object 10a after object 10a is turned 103a. In particular, the object measuring regions are configured identically. However, it would also be possible for a second object measuring region to have a functionality reduced in comparison with the first object measuring region.

Figure 2:
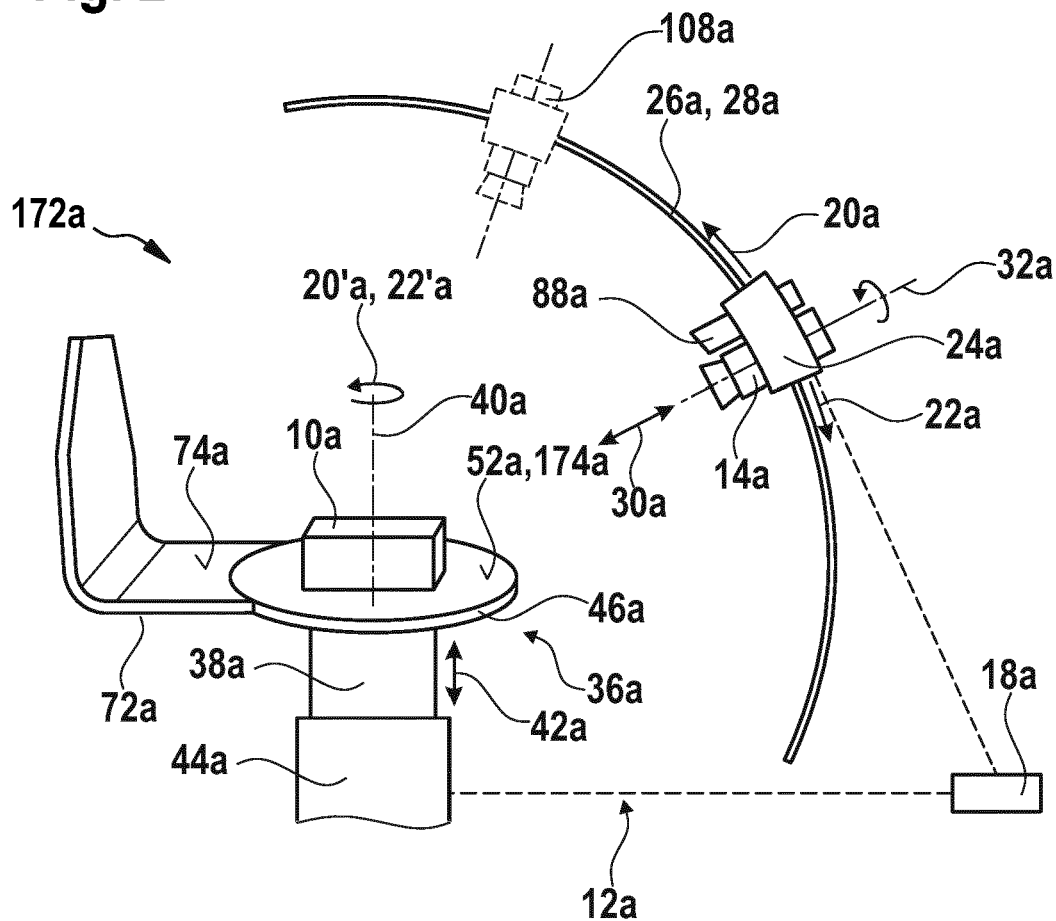
FIG. 2 shows a schematic representation of the movement device, including a nontransparent object carrier.

FIG. 2 shows the acquisition device for at least semiautomated acquisition of sets of multiple object data of at least object 10a, including a movement device 12a for generating a defined, relative movement between at least one object data acquisition unit 14a and the at least one object 10a. Movement device 12a is intended for acquiring object data from multiple perspectives.

Movement device 12a has at least one movement unit 24a for a defined movement of the at least one object data acquisition unit 14a. Movement unit 24a is intended for guiding the at least one object data acquisition unit 14a on an at least partially curved path of motion 26a. Movement unit 24a has at least one partially curved track 28a, and is intended for guiding the at least one object data acquisition unit 14a along the at least partially curved path 28. It is possible for a plurality of object data acquisition units 14a to be used. A further object data acquisition unit 108a is indicated in FIG. 2. In particular, in order to acquire object data from multiple perspectives in a more rapid manner, each object data acquisition unit 14a, 108a could cover a subsection of curved track 28a. In particular, object data acquisition units 14a, 108a could be moved simultaneously or independently of each other. Movement unit 24a is intended for guiding the at least one object data acquisition unit 14a along a direction 30a at least substantially perpendicular to a path of motion 26a. Object data acquisition unit 14a includes at least one swivel axis and/or axis of rotation 32a, about which object data acquisition unit 14a is pivoted and/or rotationally mounted. The acquisition device includes a dimension-measuring unit 88a. Dimension-measuring unit 88a preferably takes the form of a laser module. Dimension-measuring unit 88a is preferably mounted with object data acquisition unit 14a on a common guide block of movement unit 24a.

The acquisition device includes an object carrier unit 36a. Movement device 12a includes a bearing unit 38a, by which object carrier unit 36a is movably supported. Bearing unit 38a includes at least one swivel axis and/or axis of rotation 40a, about which object carrier unit 36a is pivoted and/or rotationally mounted. Bearing unit 38a has at least one path of motion 42a, along which object carrier unit 36a is movably supported. Object carrier unit 36a is preferably supported by bearing unit 38a so as to be able to move, in particular, rotate, relative to object data acquisition unit 14a. Movement device 12a includes a drive unit 44a, which is intended for moving object carrier unit 36a in an automated manner. Movement device 12a preferably includes drive unit 44a, which is intended for moving object carrier unit 36a and object data acquisition unit 14a in directions opposite to each other, in particular, contrarotationally about swivel axis and/or axis of rotation 40a of bearing unit 38a.

Object carrier unit 36a is intended for active illumination. Object carrier unit 36a has at least one light source 52a. Object carrier unit 36a includes at least one light-emitting diode (LED), in particular, at least one organic light-emitting diode (OLED). Light source 52a preferably includes an OLED screen, which is positioned flat on object carrier 46a. However, it is also possible for light source 52a to have a different form appearing useful to one skilled in the art, such as a grid-like configuration of a plurality of illumination elements; the grid-like configuration including a staggered configuration of illumination elements per row or line of the grid, or the like. Object carrier unit 36a preferably includes at least one transparent protective layer 178a for protecting light source 52a.

The acquisition device preferably includes at least one illumination unit 172a. Illumination unit 172a of the acquisition device is preferably configured in such a manner, that the object 10a situated on object carrier unit 36a is illuminated from all sides, in particular, in order to illuminate object 10a uniformly. Illumination unit 172a of the acquisition device preferably includes a plan view illumination unit and a front illumination unit. The plan view illumination unit is preferably intended for illuminating the object 10a situated on object carrier unit 36a from above. The front illumination unit is preferably intended for illuminating the object 10a situated on object carrier unit 36a from the front, in particular, along its periphery. Illumination elements of illumination unit 172a are preferably positioned so as to be distributed on at least essentially the entire inner surface of a housing unit 62a of the acquisition device.

Illumination unit 172a is, in particular, at least semiautomatically adjustable as a function of a parameter of object 10a and/or of object data acquisition unit 14a.

Illumination unit 172a is preferably at least semiautomatically adjustable as a function of a size, a surface finish, a geometric shape, or further parameters of object 10a appearing useful to one skilled in the art. Illumination unit 172a is preferably at least semiautomatically adjustable as a function of a focus, a focal length, a frame rate, or further parameters of object data acquisition unit 14a appearing useful to one skilled in the art.

Figure 14:
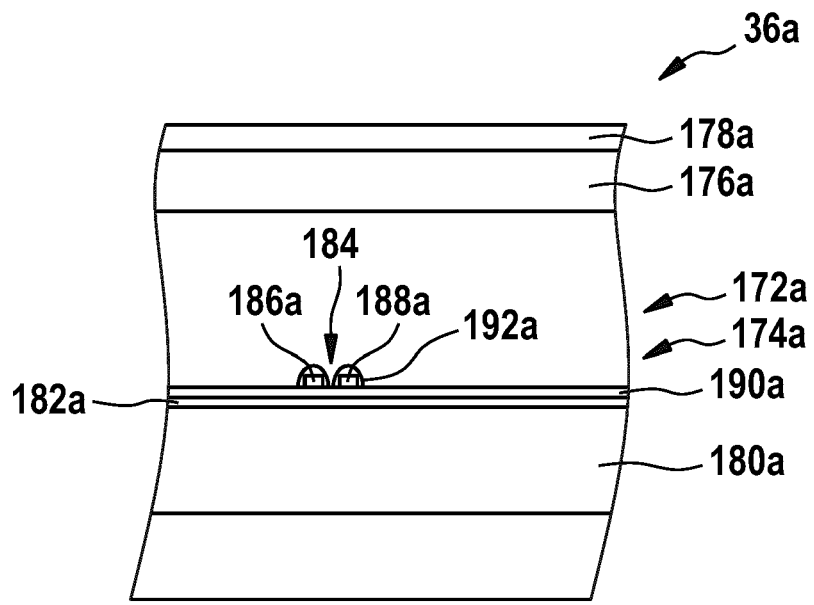
FIG. 14 shows a schematic sectional view of an object carrier unit and of an illumination unit of the acquisition device according to the present invention, the illumination unit being positioned on the object carrier unit.

Illumination unit 172a preferably includes at least one subsurface illumination unit 174a, which is situated at least partially on object carrier unit 36a. Subsurface illumination unit 174a is preferably formed by light source 52a of object carrier unit 36a. FIG. 14 shows a sectional view of object carrier unit 36a, including the subsurface illumination unit 174a situated on it. Object carrier unit 36a preferably includes at least one base plate 176a. Base plate 176a is preferably made of a transparent material. Base plate 176a is preferably diffuse. Base plate 176a is preferably made of glass; particles, in particular, ceramic particles, being incorporated into the glass, in order to produce, in particular, a diffuse form. As an alternative to ceramic particles in the base plate 176a taking the form of a glass plate, it is also possible for the base plate to include plastic particles, fiber particles, or other particles, which appear useful to one skilled in the art and render possible a diffuse embodiment of the base plate. Base plate 176a preferably forms a transparent object carrier wall 46a of object carrier unit 36a.

Subsurface illumination unit 174a is intended for transilluminating the, in particular, at least semitransparent object carrier unit 36a. Subsurface illumination unit 174a includes at least one illumination element 184a. Subsurface illumination unit 174a preferably includes a plurality of illumination elements 184*a*. For the sake of clarity, a single illumination element 184*a* is shown in FIG. 14. Illumination element 184*a* takes the form of a light-emitting diode group element. Illumination element 184*a* includes at least one multicolored LED 186*a*, in particular, an RGB LED, and at least one white LED 188*a*. Multicolored LED 186*a* takes the form of an RGB LED. Illumination element 184*a* may include, for example, LED chips of the manufacturer Nichia, as well as Seoul. However, it is also possible for illumination element 184*a* to have a different form appearing useful to one skilled in the art. Multicolored LED 186*a*, for example, a Nichia RGB chip NSSM124DT, and white LED 188*a*, for example, a Seoul Sunlike chip STW9C2PB-SC, form, together, the illumination element 184*a*. Multicolored LED 186*a* and white LED 188*a* are positioned together on a common circuit board 190*a* of subsurface illumination unit 174*a*. Circuit board 190*a* is made of FR4. Alternatively, it is possible for circuit board 190*a* to include an aluminum core. Illumination element 184*a* has a color temperature of 5000 K and a color-rendering index of at least 95. A plurality of illumination elements 184*a* are positioned uniformly in such a manner, that a low thermal resistance is attainable and/or a high heat dissipation is achievable. Illumination elements 184*a* are each interconnected on circuit board 190*a* in groups of five illumination elements 184*a* (not shown here). Circuit board 190*a* has a top coating of paint, which corresponds to a bright color, in particular, white. Subsurface illumination unit 174*a* is preferably positioned underneath base plate 176*a*. Subsurface illumination unit 174*a* is preferably situated between base plate 176*a* and a frame unit 180*a* of object carrier unit 36*a*.

Subsurface illumination unit 174*a* preferably includes at least one optical diffusor element 192*a*. Optical diffusor element 192*a* is preferably situated on circuit board 190*a*, in particular, on illumination element 184*a*. It is possible for each LED 186*a*, 188*a* of illumination element 184*a* to be assigned its own optical diffusor element 192*a*, or for a single diffusor element 192*a* to be assigned to multicolored LED 186*a* and white LED 188*a*. Optical diffusor element 192*a* is preferably at a maximum distance of less than 50 mm, in particular, less than 30 mm, particularly preferably, less than 20 mm, and particularly preferably, less than 15 mm, relative to a surface of base plate 176*a* or of protective layer 178*a* facing away from subsurface illumination unit 174*a*.

Figure 15:
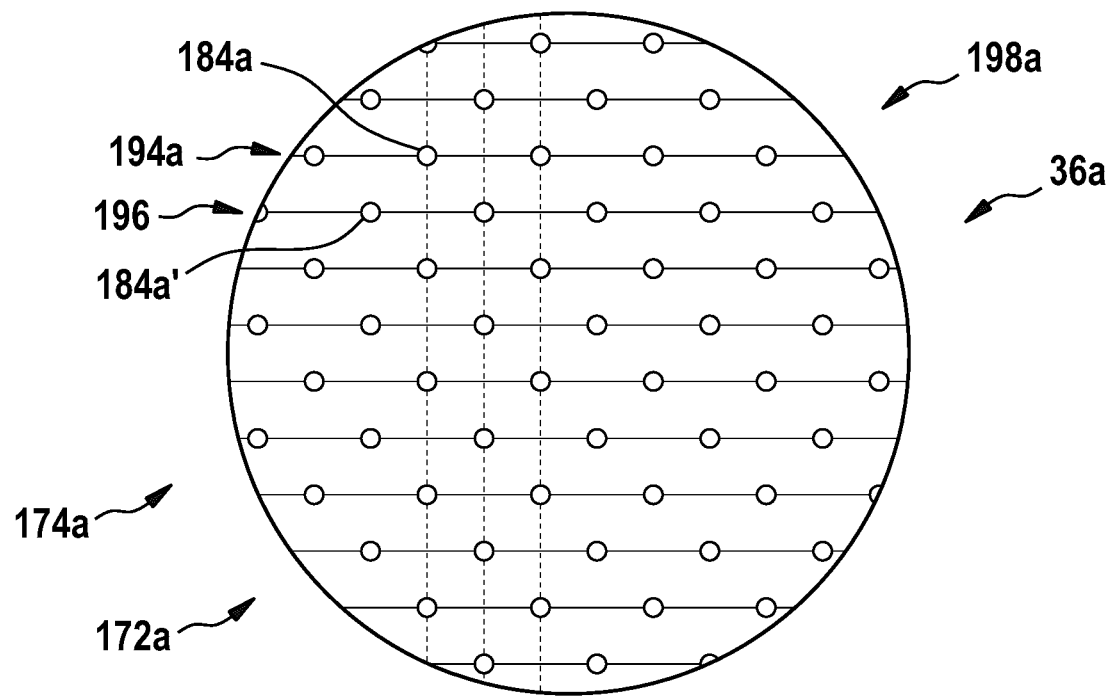
FIG. 15 shows a plan view of the object carrier unit and the illumination unit from FIG. 14, the illumination unit being positioned on the object carrier unit.

FIG. 15 shows a configuration of the illumination unit 172*a*, in particular, of the subsurface illumination unit 174*a*, on object carrier unit 36*a*. Illumination unit 172*a*, in particular, subsurface illumination unit 174*a*, is situated on object carrier unit 36*a* in the form of a grid, in particular, a latticed network. Preferably, a plurality of illumination elements 184*a* of subsurface illumination unit 174*a* are uniformly distributed on object carrier unit 36*a*. Individual illumination elements 184*a* of subsurface illumination unit 174*a* are preferably positioned in a uniformly distributed manner in a line or row 194*a* of a grid 198*a* of subsurface illumination unit 174*a*; further illumination elements 184*a*' of subsurface illumination unit 174*a* of a further line or row 196*a* or grid 198*a* being positioned so as to be offset relative to illumination elements 184*a* of line or row 194*a* of grid 198*a*. Further configurations of illumination elements 184*a*, 184*a*' appearing useful to one skilled in the art are also possible, for example, a spiral-shaped configuration, a zig-zag-type configuration, or the like.

Object carrier unit 36*a* further includes at least the, in particular, extruded or cast, frame unit 180*a*, which is intended for, in particular, passive cooling of illumination unit 172*a*, in particular, of subsurface illumination unit 174*a*. Frame unit 180*a* is preferably intended for receiving illumination unit 172*a*, in particular, subsurface illumination unit 174*a*. Frame unit 180*a* is made of a, in particular, extruded, metal. Frame unit 180*a* is made at least partially of aluminum. Frame unit 180*a* is made at least substantially completely of aluminum. Alternatively, it is possible for frame unit 180*a* to be made of an aluminum alloy including, in particular, a copper component. Frame unit 180*a* takes the form of an extruded aluminum member, in particular, an axially extruded aluminum member. Alternatively, it is possible for frame unit 180*a* to be cast, in particular, from a metal. Frame unit 180*a* is intended for, in particular, passive cooling of illumination unit 172*a*, in particular, of subsurface illumination unit 174*a*. Frame unit 180*a* is intended for absorbing heat of illumination unit 172*a*, in particular, of subsurface illumination unit 174*a*, generated during operation of illumination unit 172*a*, in particular, of subsurface illumination unit 174*a*, and for conducting it away from illumination unit 172*a*, in particular, from subsurface illumination unit 174*a*. Frame unit 180*a* is used as a cooling body for illumination unit 172*a*, in particular subsurface illumination unit 174*a*.

The acquisition device includes at least one heat conducting element 182*a*, which is intended for attaching illumination unit 172*a*, in particular, subsurface illumination unit 174*a*, to frame unit 180*a*. Heat conducting element 182*a* is intended for fixing illumination element 172*a*, in particular, subsurface illumination unit 174*a*, to frame unit 180*a* with the aid of a continuous material connection. Heat conducting element 182*a* is intended for bonding illumination element 172*a*, in particular, subsurface illumination unit 174*a*, to frame unit 180*a*. In addition to bonding, it is possible for illumination unit 172*a*, in particular, subsurface illumination unit 174*a*, to be fixed to frame unit 180*a* in a force-locked and/or form-locked manner, in particular, with the aid of a screw connection. Heat conducting element 182*a* takes the form of a metal foil, in particular, aluminum foil, coated on both sides with thermally conductive rubber. For example, heat conducting agent 180*a* may take the form of QPad® Gap Filler II, in particular, 0.15 mm of QPad® Gap Filler II. As an alternative, it is possible for heat conducting element 182*a* to take the form of a thermally conductive paste or another heat conducting element appearing useful to one skilled in the art. Heat conducting element 182*a* is intended for thermally coupling illumination unit 172*a*, in particular, subsurface illumination unit 174*a*, to frame unit 180*a*. Heat conducting element 182*a* is intended for achieving greater heat transfer from illumination unit 172*a*, in particular, subsurface illumination unit 174*a*, to frame unit 180*a*, than in the case of a direct coupling between illumination unit 172*a*, in particular, subsurface illumination unit 174*a*, and frame unit 180*a*.

Object carrier unit 36*a* and/or illumination unit 172*a* is/are designed to be free of active coolers. In the present exemplary embodiments, object carrier unit 36*a* and illumination unit 172*a* are free of active coolers. Object carrier unit 36*a* and illumination unit 172*a* are designed so as to be free of fans generating an air current. Object carrier unit 36*a* and illumination unit 172*a* are preferably designed to be free of blowers, fans, ventilators or other active coolers appearing useful to one skilled in the art.

In addition, object carrier unit 36*a* includes at least the protective layer 178*a* situated, in particular, on a surface of base plate 176*a*. Protective layer 178*a* preferably takes the form of a foil. Protective layer 178*a* is preferably situated on, in particular, fixed to, base plate 176*a* so as to be removable or exchangeable. Protective layer 178*a* preferably takes the form of a PVC film. However, it is also possible for protective layer 178*a* to have a different form appearing useful to one skilled in the art. It is possible for protective layer 178*a* to have a patterned surface, in particular, for scattering light. It is further possible for protective layer 178*a* and/or base plate 176*a* to be coated with a UV paint, in particular, at a geometric center of protective layer 178*a* and/or base plate 176*a*, in order to indicate a center of object carrier unit 36*a*. However, it is also possible for acquisition device to include at least one projection unit, with the aid of whose data, in particular, a marking, such as a center marking or the like, may be projected onto protective layer 178*a* and/or base plate 176*a*.

Object carrier unit 36*a* includes a weight-measuring unit. Object carrier unit 36*a* includes at least one detachably connected object carrier 46*a*. To acquire object data, object carrier 46*a* is preferably raised from path conveyor unit 56*a* (cf. FIG. 1) by bearing unit 38*a*. After the acquisition of object data, object carrier 46*a* is preferably lowered by bearing unit 38*a* onto path conveyor unit 56*a*. For raising and lowering object carrier 46*a*, path conveyor unit 56*a* preferably includes a suitable recess, through which bearing unit 38*a* may be connected temporarily to object carrier 46*a* in a form-locked and/or force-locked manner.

The acquisition device includes a processing unit 18*a*, which is intended for utilizing a forward movement 20*a*, 20'*a* and return movement 22*a*, 22'*a* of an object data acquisition unit 14*a* and/or of an object 10*a* for data acquisition.

The acquisition device includes a contrast unit 72*a*, which is provided for active illumination. The acquisition device includes a contrast unit 72*a*, which has at least one light source 74*a*. The acquisition device includes a contrast unit 72*a*, which has at least one light-emitting diode, in particular, at least one organic light-emitting diode. In at least one operating state, contrast unit 72*a* is preferably positioned on object carrier unit 36*a*. However, it is also possible for contrast unit 72*a* to be supported so as to be movable relative to object carrier unit 36*a*, in particular, supported so as to be movable together with object data acquisition unit 14*a* or relative to object carrier unit 36*a* and relative to object data acquisition unit 14*a*. Light source 74*a* preferably includes an OLED screen, which is positioned flat on contrast unit 72*a*. Light source 74*a* of contrast unit 72*a* preferably forms a plan view illumination unit and/or a front view illumination unit of illumination unit 172*a*.

Figure 3:
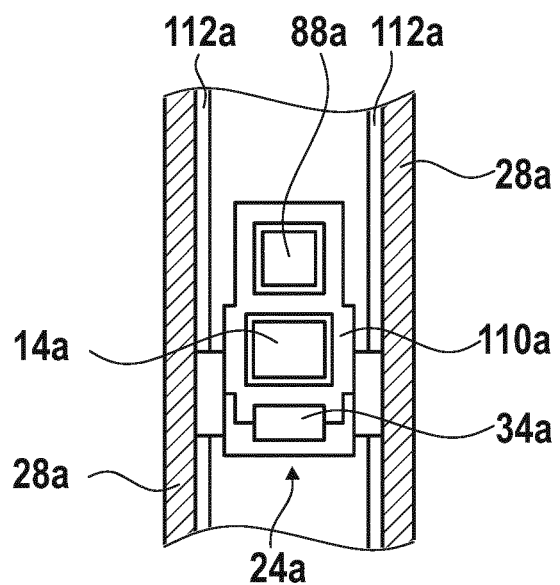
FIG. 3 shows a schematic representation of the movement unit of the object data acquisition unit.

FIG. 3 shows a possible embodiment of movement unit 24*a*. Movement unit 24*a* includes a drive unit 34*a*, which is intended for moving object data acquisition unit 14*a* in an automated manner. In particular, movement unit 24*a* has a guide block, on which object data acquisition unit 14*a* is mounted. Curved track 28*a* preferably takes the form of a guide rail having a guideway 112*a*. In particular, curved track 28*a* includes two tracks running in parallel. The guide block is preferably situated between the tracks running in parallel.

Figure 12:
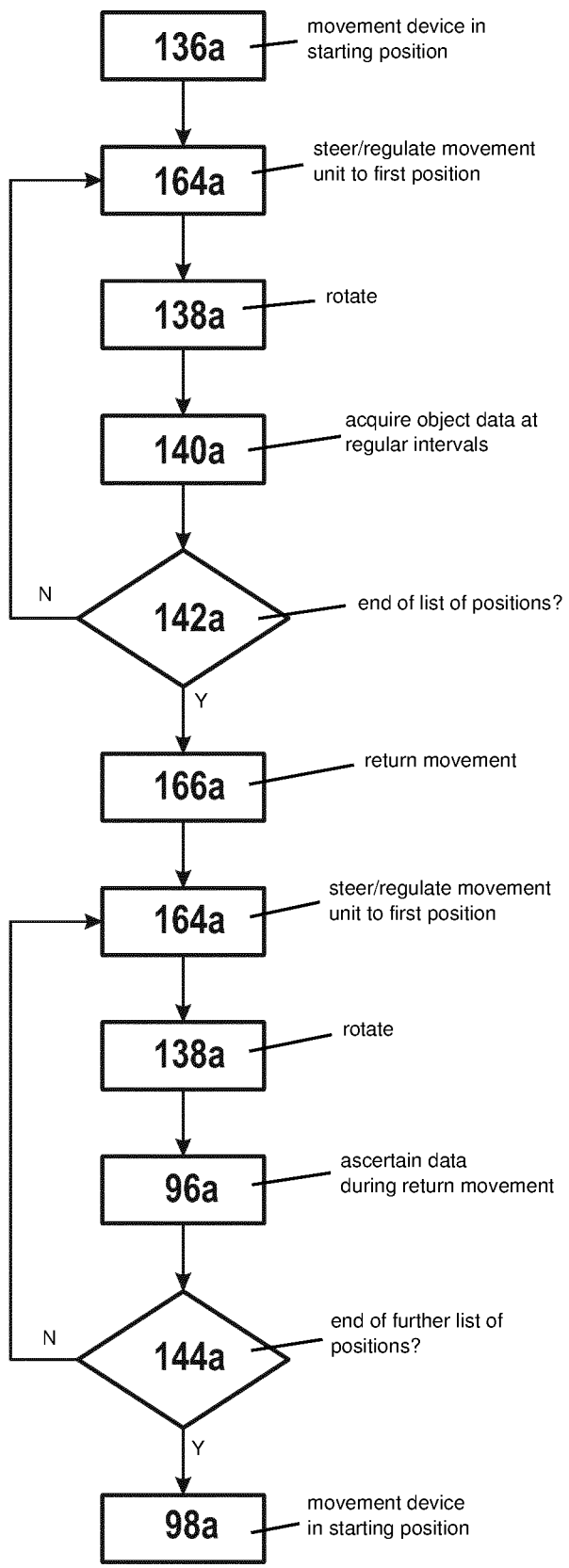
FIG. 12 shows a schematic representation of the method for acquiring a set of multiple object data.
Figure 13:
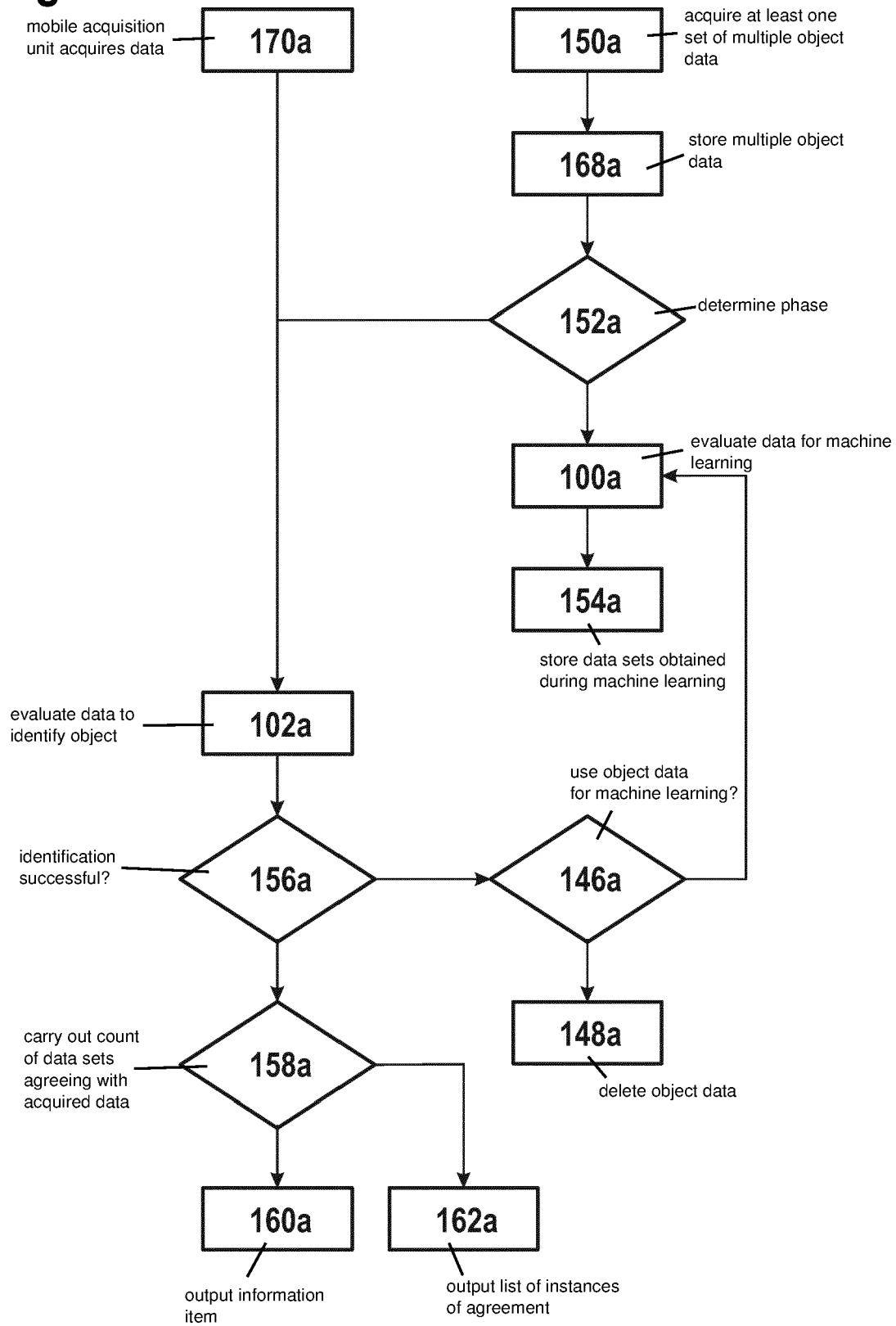
FIG. 13 shows a schematic representation of the method for identifying objects.

FIGS. 12 and 13 each show a method utilizing an acquisition device according to the present invention and/or a system according to the present invention.

FIG. 12 shows a schematic representation of the method for acquiring a set of multiple object data. In an initial phase 136*a*, it is preferably ensured that movement device 12*a* is in an intended starting position 98*a*. With the aid of control and/or regulating unit 82*a*, in particular, on the basis of a previous acquisition of object parameters, operating parameters for at least movement device 12*a* and object data acquisition unit 14*a* are preferably set automatically. In at least one method step, at least one parameter of object data acquisition unit 14*a* is preferably set at least semiautomatically as a function of the acquired parameter of object 10*a*. In particular, a list of positions for object carrier unit 36*a* and object data acquisition unit 14*a* is generated, in which object data are acquired with the aid of object data acquisition unit 14*a*. In a further method step 164*a*, movement unit 24*a* of object data acquisition unit 14*a* is preferably steered to, and/or regulated so as to approach, the first position. In a further method step, or already while movement unit 24*a* is moved to a new position, object carrier unit 36*a* is preferably induced to rotate 138*a* uniformly about axis of rotation and/or swivel axis 40*a* with the aid of drive unit 44*a*. In a further method step 140*a*, object data are acquired by object data acquisition unit 14*a* at regular intervals, for example, every 10° of rotation of object carrier unit 36*a*. In particular, the individual acquisitions may be initiated, for example, with the aid of an angular displacement sensor, or they may take place in regular time intervals matched to an angular speed of object carrier unit 36*a*. In at least one method step, at least one parameter, in particular, a movement parameter and/or a positional parameter, of contrast unit 72*a* is changed as a function of a parameter of the object 10*a* to be measured, a parameter of object data acquisition unit 14*a* and/or a parameter of an illumination unit of the acquisition device. In at least one method step, a parameter, in particular, a movement parameter and/or a positional parameter, of contrast unit 72*a*, is preferably changed as a function of a parameter of the object 10*a* to be measured that takes the form of a dimension, in particular, a size, a cast shadow, or the like, in particular, as a result of a movement of contrast unit 72*a* relative to object 10*a* to be measured, with the aid of movement device 12*a*. In at least one method step, a parameter, in particular, a movement parameter and/or a positional parameter, of contrast unit 72*a* is preferably changed as a function of a parameter, taking the form of a focal length, a focus, an exposure time, or the like, of the object data acquisition unit 14*a* taking, in turn, the form of, in particular, a camera, in particular, as a result of a movement of contrast unit 72*a* relative to object data acquisition unit 14*a*, with the aid of movement device 12*a*. In at least one method step, at least one parameter of an illumination unit 172*a* of the acquisition device is preferably set at least semiautomatically as a function of an acquired parameter of object 10*a*. In particular, in at least one method step, at least one parameter of illumination unit 172*a* of the acquisition device is set at least semiautomatically as a function of at least one parameter of object data acquisition unit 14*a*. In at least one method step, a parameter, in particular, a movement parameter and/or a positional parameter, of contrast unit 72*a* is preferably changed as a function of a parameter of the illumination unit, taking the form of an illumination intensity, a brightness, or the like, in particular, as a result of a movement of contrast unit 72*a* relative to the illumination unit, with the aid of movement device 12*a*. In particular, in at least one method step, at least semiautomated measurement error identification is carried out. In a further method step, after a, in particular, complete, rotation of object carrier unit 36*a*, a check 142*a* is preferably made as to whether an end of the list of positions has been reached. In response to a negative result of check 142*a*, movement unit 24*a* of object data acquisition unit 14*a* is preferably steered to, and/or regulated so as to approach, the next position. In a further method step 166*a*, a return movement 22*a* is preferably initiated in response to a positive result of check 142*a*. In the method, in at least one method step 96*a*, at least one set of multiple data is ascertained during a return movement 22a of movement device 12a back into a starting position 98a of movement device 12a, after a forward movement 20a. In particular, a further list of positions for a return movement 22a is dealt with in an analogous manner. If an end of the further list of positions is reached during a corresponding, further check 144a, movement device 12a is preferably steered into starting position 98a. A list preferably includes at least standard positions, for example, in the case of a circular path of the object data acquisition unit, 0°, 45° and 90° with respect to starting position 98a. A list preferably includes at least object-specific positions. It is also possible for all positions, among which a measurement takes place, to be distributed uniformly over all lists. In particular, after the acquisition of a data set in method step 96a, 140a, rotation 138a may be stopped or maintained continually up to a return of movement device 12a to starting position 98a.

FIG. 13 shows a schematic representation of the method for identifying an object 10a. In particular, FIG. 13 shows a method utilizing a system according to the present invention, where in at least one method step, the sets of object data generated are evaluated for machine learning 100a. Two phases are preferably distinguished. In particular, a learning phase and an identification phase are differentiated. A check 152a as to which phase the method is in, is preferably carried out in at least one method step. In a first method step 150a, at least one set of multiple object data of at least one object 10a is preferably acquired by the acquisition device. In at least one method step, object carrier unit 36a and object data acquisition unit 14a are preferably moved in directions opposite to each other, in particular, about swivel axis and/or axis of rotation 40a of bearing unit 38a of movement device 12a, in particular, in order to acquire a set of multiple object data of at least one object 10a with the aid of the acquisition device. In a further method step 168a, the set of multiple object data is preferably stored in storage unit 92a. In the learning phase, the generated sets of object data are preferably evaluated for machine learning 100a in at least one method step. In a further method step 154a, the data sets obtained during machine learning 100a are preferably stored in storage unit 92a. In particular, the original sets of multiple object data may be deleted in method step 154a. After completion of the learning phase, the system may preferably be used for identifying objects 10a measured previously. Object data regarding an object 10a to be identified are preferably acquired by a mobile acquisition unit 94a. Alternatively, the acquisition device is used in method step 150a for acquiring object data. The object data are preferably supplied to processing unit 16a. In the method, the sets of object data generated are evaluated in at least one method step, in order to identify 102a object 10a. In the method, the data acquired by mobile acquisition unit 94a are evaluated in at least one method step, in order to identify 102a object 10a. In particular, it is checked if, after an evaluation by processing unit 16a, the sets of object data generated by the acquisition device in method step 150a and/or the data acquired by mobile acquisition unit 94a in method step 170a at least partially agree with the data sets generated in the learning phase. Preferably, two data sets partially agree, if one data set is a subset of the other. In a further method step 156a, it is preferably checked if identification 102a was successful, in particular, if at least one instance of agreement was able to be found. If the acquired object data were not able to be brought into agreement with any object measured beforehand, then, in an optional step, a decision 146a of an operator is checked as to whether the acquired object data should be used for machine learning 100a, in order to expand the list of identifiable objects, and/or in order to modify the data set stored in the storage unit to form an object already known. In the case of a negative decision 146a, then, in a final method step 148a, the object data are preferably deleted. After a successful identification 102a, then, in a further method step, a count 158a of the data sets agreeing with the acquired data is preferably carried out. In the case of a single instance of partial agreement, then, in a final method step 160a, an information item about the corresponding object, such as a name, an identification number, and/or an order number, is preferably outputted. In the case of a plurality of objects in question, then, in a method step 162a, a list of all instances of agreement is preferably outputted. Preferably, an information item is outputted, with the aid of which the objects may be distinguished. In at least one method step in the method, a material is deduced from at least one data set. A material is preferably deduced during machine learning 100a and/or identification 102a. In the acquisition of a set of multiple object data in method step 150a, it is also possible for the acquisition device to already utilize at least one set of object data to deduce a material.

In FIGS. 4-6, 7-8, 9, 10 and 11, in each instance, a further exemplary embodiment of the present invention is shown. The following descriptions and the figures are limited mainly to the differences between the exemplary embodiments; with regard to identically designated components, in particular, with regard to components having the same reference characters, reference also being able to be made, in principle, to the figures and/or the description of the other exemplary embodiments, in particular, of FIGS. 1 through 3, as well as 12 and 13. In order to distinguish between the exemplary embodiments, the letter "a" follows the reference numerals of the exemplary embodiment in FIGS. 1 through 3, as well as 12 and 13. In the exemplary embodiments of FIGS. 4-6, 7-8, 9, 10 and 11, the letter "a" is replaced by the letters "b" through "f."

Figure 4:
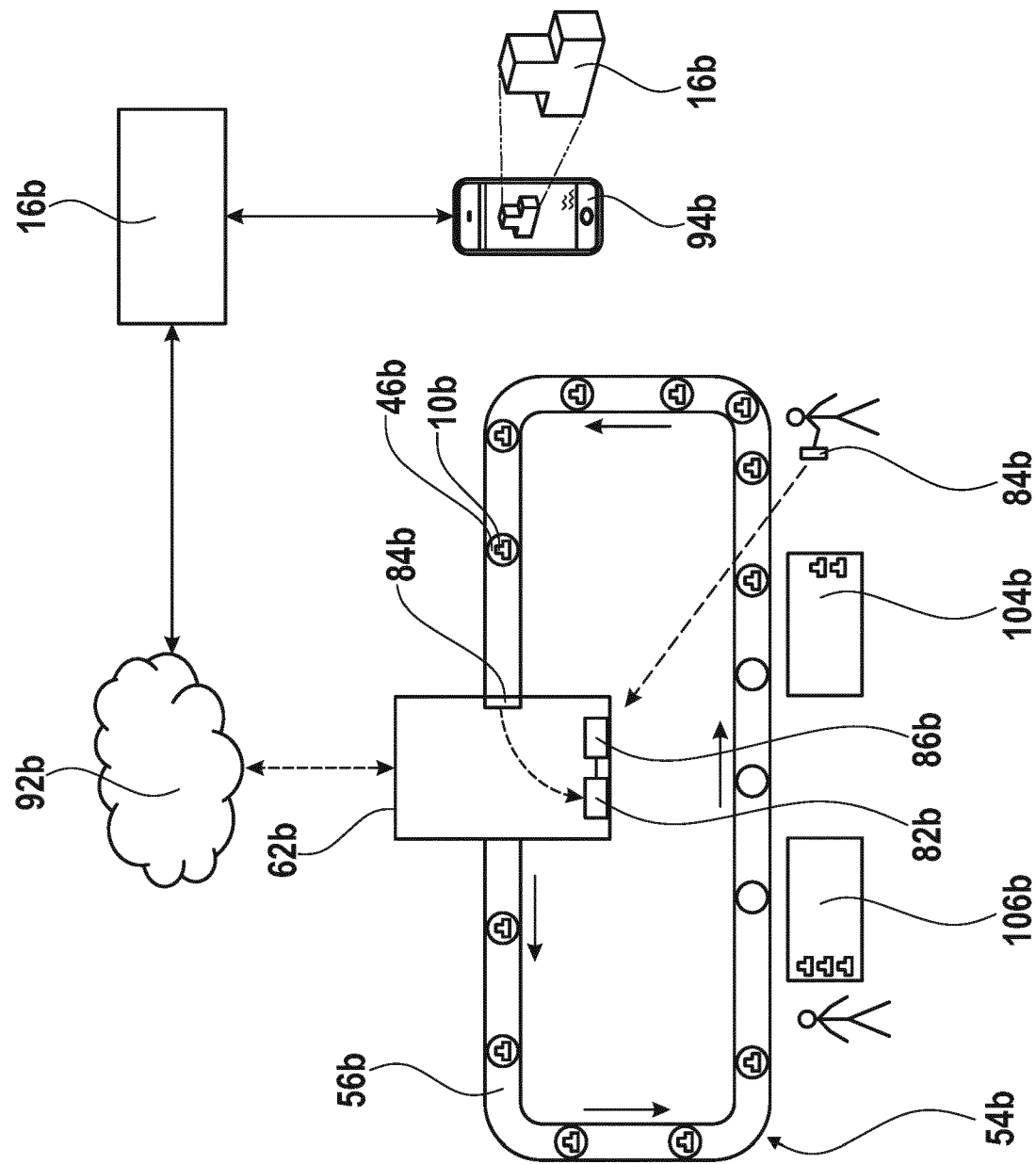
FIG. 4 shows a schematic representation of a system for transparent object carriers.

FIG. 4 shows a schematic representation of a system having a single object data acquisition region, which is surrounded by a housing unit 62b. In particular, by using an object carrier 46b having an object carrier wall 48b (cf. FIG. 5) that is transparent in at least one operating state, manual turning 103a (cf. FIG. 1) of the object may be omitted.

Figure 5:
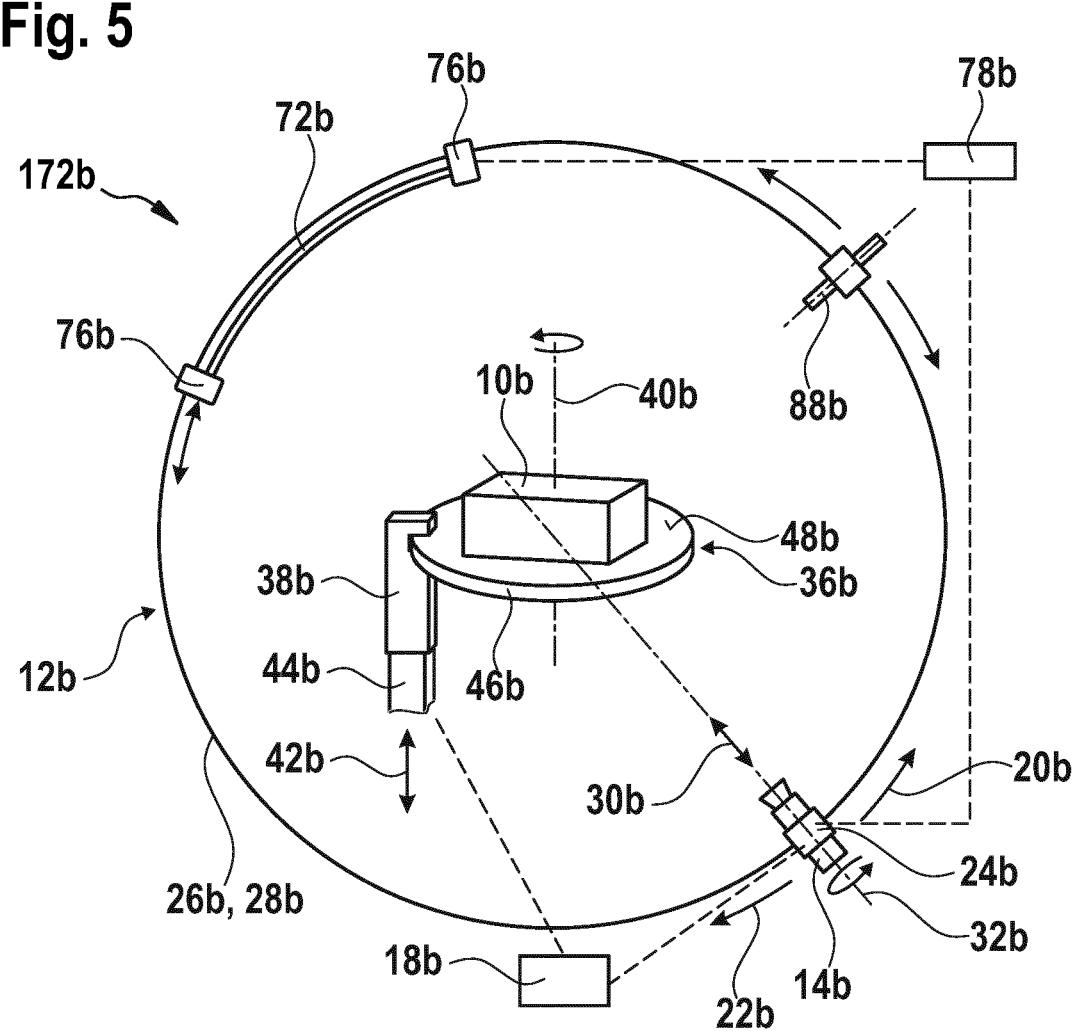
FIG. 5 shows a schematic representation of the movement device, including a transparent object carrier.
Figure 6:
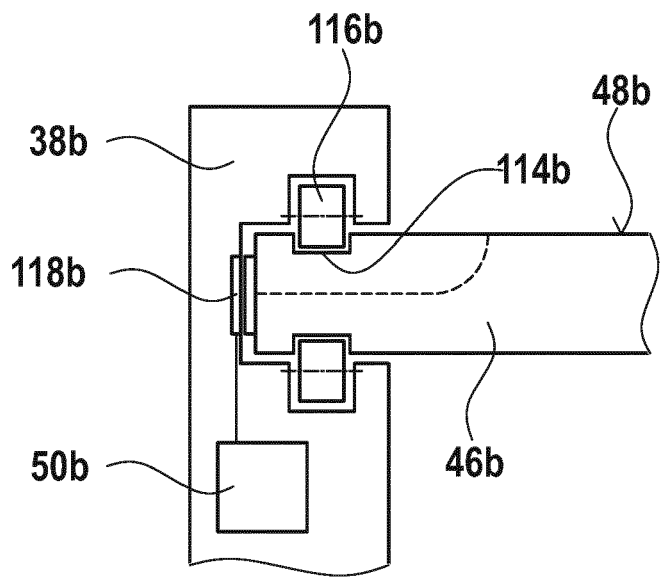
FIG. 6 shows a schematic representation of the bearing unit in the case of a lateral set-up.

FIG. 5 shows a schematic representation of movement device 12b, and FIG. 6 shows a schematic representation of bearing unit 38b. Object carrier unit 36b includes at least one object carrier 46b, which has an object carrier wall 48b that is transparent in at least one operating state. Object carrier unit 36b has a setting unit 50b, with the aid of which a reflectance, an absorbance, and/or transmittance is adjustable. Setting unit 50b is connected to object carrier wall 48b, in particular, via a friction contact 118b. The transparency of object carrier 46b preferably allows object data to be acquired from the side of object carrier 46b facing away from object 10b. To acquire a set of multiple object data, object 10b is preferably rotated 360° about swivel axis and/or axis of rotation 40b. Object data acquisition unit 14b is preferably moved along curved track 28b, at least on a circular arc having a center angle of 180°. Any desired perspective, that is, at least within a control and/or regulating accuracy of movement device 12b, may be assumed.

Bearing unit 38b is preferably situated to the side of object carrier unit 36b, in order not to block a line of sight of object data acquisition unit 14b to object 10b. Bearing unit 38b embraces object carrier unit 36b at least partially. Object carrier unit 36b includes, in particular, a groove 114b for receiving a rolling element 116b of bearing unit 38b. For example, groove 114b and rolling element 116b could also take the form of a rack-and-pinion drive. In particular, the axes of rotation of rolling element 116b are movably supported, in order to allow object carrier unit 36b to be stopped on/removed from bearing unit 38b.

The acquisition device 172b includes a contrast unit 72b; movement device 12b having a drive unit 76b for moving contrast unit 72b in an automated manner. The acquisition device includes a contrast unit 72b; movement device 12b having a movement unit 78b, which is intended for simultaneously moving contrast unit 72b and object data acquisition unit 14b. In particular, movement unit 78b synchronizes drive units 76b and the drive unit of movement unit 24b, not shown in further detail. Processing unit 18b and movement unit 78b preferably take the form of a single, central processing unit.

A dimension-measuring unit 88b includes a movement unit, in particular, a guide block, independent of object data acquisition unit 14b.

Figure 7:
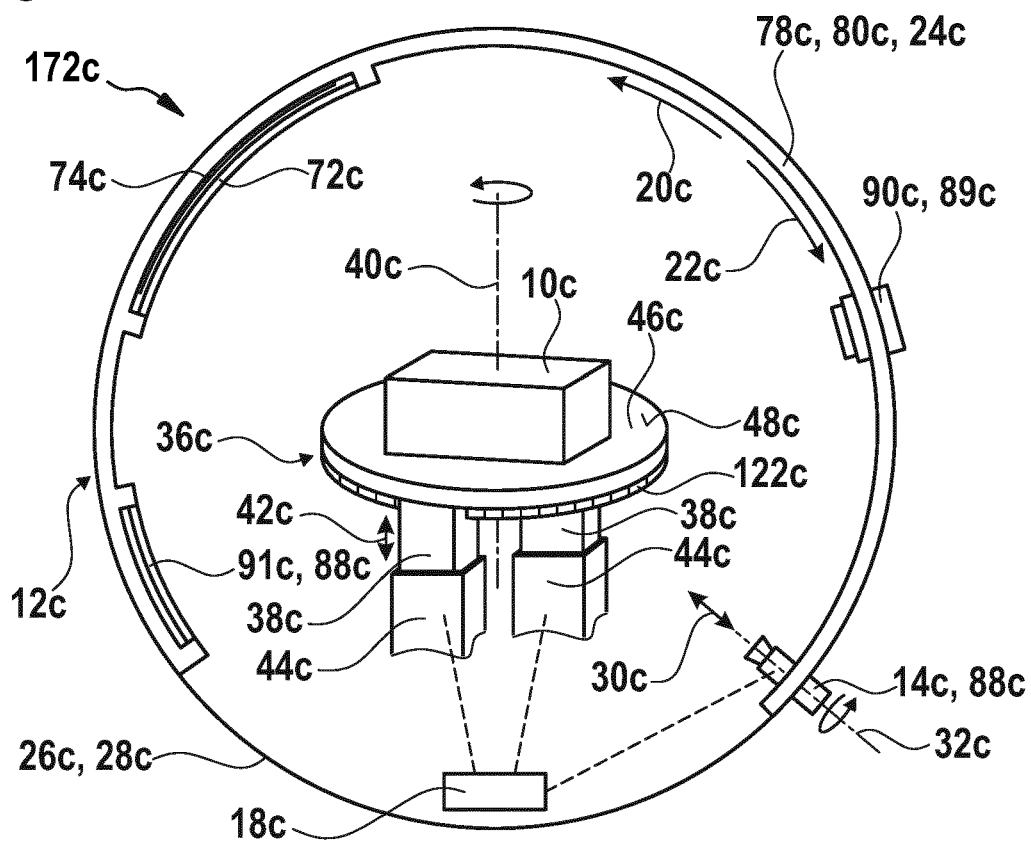
FIG. 7 shows a schematic representation of the movement device, including a structural element for simultaneously moving the object data acquisition unit and the contrast unit.

In FIG. 7, the acquisition device 172c includes a contrast unit 72c; the movement unit 78c having a structural element 80c, which, in at least one operating state, interconnects contrast unit 72c and object data acquisition unit 14c substantially rigidly. In particular, structural element 80c takes the form of a common guide block. Contrast unit 72c is preferably intended for active illumination. In particular, viewed from object carrier unit 36c, a light source 74c is situated behind contrast unit 72c. The acquisition device includes a penetrating-radiation unit 89c, in particular, an x-ray unit, which is intended for transmitting radiation through at least one object 10c at least partially. Penetrating-radiation unit 89c preferably includes at least one radiation source 90c and a screen 91c. Penetrating-radiation unit 89c is preferably situated on movement unit 24c of object data acquisition unit 14c. Preferably, object data acquisition unit 14c is used simultaneously as a dimension-measuring unit 88c, in that the sets of multiple object data are linked to, in particular, a speed of rotation of object carrier unit 36c about swivel axis and/or axis of rotation 40c.

Figure 8:
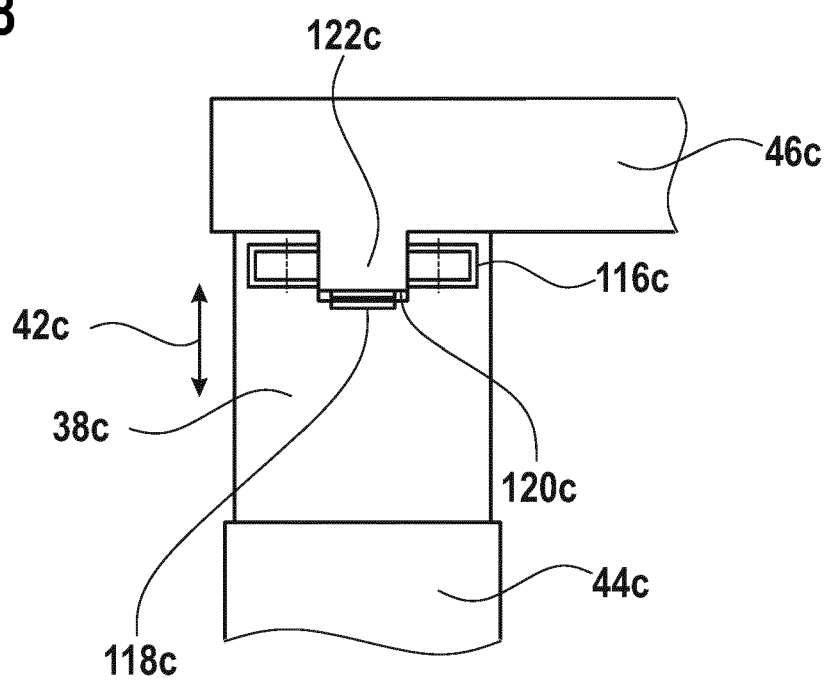
FIG. 8 shows a schematic representation of the bearing unit in the case of a lower-side set-up.

FIGS. 7 and 8 show a schematic representation of bearing unit 38c. Bearing unit 38c is preferably formed in two pieces. Bearing unit 38c is intended for receiving a drive ring 122c in a groove 120c of the bearing unit; the drive ring being situated on the side of object carrier unit 36c facing away from object 10c.

Figure 9:
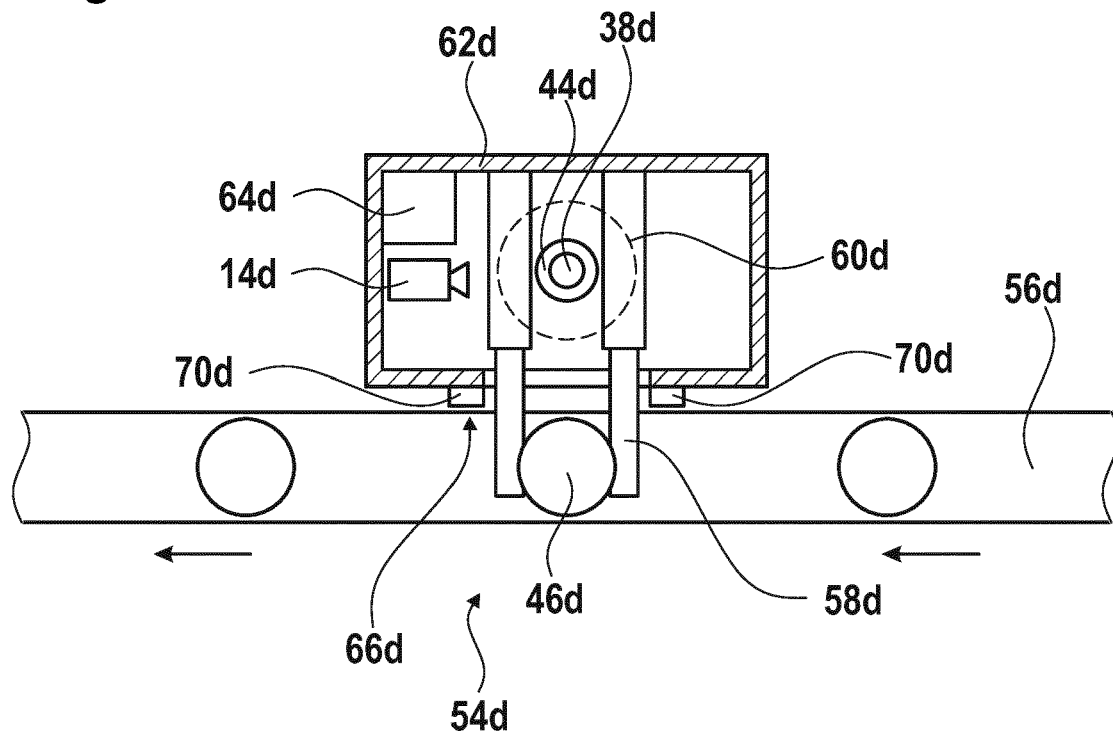
FIG. 9 shows a schematic representation of the transport unit and a positioning unit.

FIG. 9 shows an acquisition device, in which transport unit 54d is positioned to the side of housing unit 62d. Transport unit 54d includes a positioning unit 58d, in order to position an object, in particular, down from the path conveyor unit 56d, in an object measuring region 60d. In particular, positioning unit 58d takes the form of telescoping, gripping units, which are slid under an object carrier 46d on transport unit 54d. On the side facing path conveyor unit 56d, object carriers 46d preferably have a recess for receiving a gripping unit. In response to withdrawal of the gripping units, a connection of object carrier 46d with bearing unit 40d is preferably produced.

The acquisition device includes an anti-contamination unit 64d, which is intended for at least reducing contamination of an object measuring region 60d and/or of a region of an object data acquisition unit 14d, in particular, inside of housing unit 62d. Anti-contamination unit 64d is intended for generating a pressure above atmospheric inside of housing unit 62d. In particular, by positioning anti-contamination unit 64d behind object data acquisition unit 14d and/or behind object measuring region 60d, as viewed from the opening of housing unit 62d, a fluid stream is generated, which is directed from object data acquisition unit 14d and/or from object measuring region 60d to the opening of housing unit 62d. Intrusion of dust and/or other dirt particles is advantageously reduced. The acquisition device includes a treatment unit 66d, which is intended for treating, in particular, for cleaning, at least one object prior to acquisition of an object data set. Treatment unit 66d includes a fluid control unit 70d for controlling and/or regulating a fluid stream. In particular, the fluid control unit includes air nozzles. Fluid control unit 70d preferably generates an air current, which is directed away from housing unit 62d. An air current generated by fluid control unit 70d is preferably directed onto an object carrier 46d, which is situated in front of the opening of housing unit 62d. An air current generated by fluid control unit 70d is preferably intended for blowing away dust particles and other contamination, which are situated on object carrier 46d and/or on an object on object carrier 46d, in particular, in a direction opposite to housing unit 62d.

Figure 10:
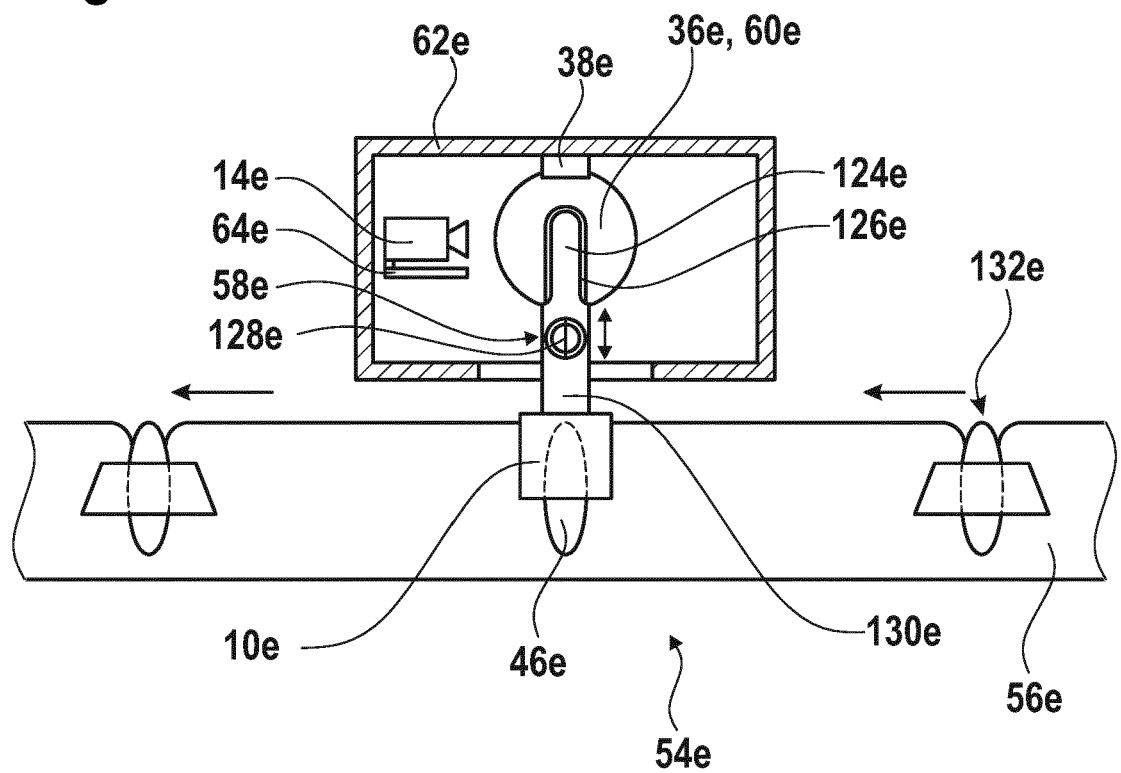
FIG. 10 shows a schematic representation of the transport unit and a further positioning unit.

FIG. 10 shows an acquisition device, in which transport unit 54e is positioned to the side of housing unit 62e. Transport unit 54e includes a positioning unit 58e, in order to position an object, in particular, down from the path conveyor unit 56e, in an object measuring region 60e. In particular, positioning unit 58e includes a magnetic foot 128e, which is movably supported in a guideway 130e. Magnetic foot 128e preferably has an electromagnet for switching the magnetic force. As an alternative, the magnetic foot includes a permanent magnet. Preferably, magnetic foot 128e is slid automatically under an object carrier 46e on path conveyor unit 56e. Path conveyor unit 56e preferably includes a recess 132e, via which magnetic foot 128e produces a force-locked connection to object carrier 46e. Object carrier 46e is preferably guided through recess 132e of path conveyor unit 56e to object carrier unit 36e. Object carrier unit 36e preferably has a counterpart complementary to object carrier 46e. In particular, in at least one intended operating state, the counterpart and object carrier 36e complement each other to form a substantially circular disk. In particular, object carrier unit 36e includes a recess 124e, which essentially takes the form of a negative shape of object carrier 46e. In particular, recess 124e has an offset 126e from a rack of object carrier 46e. The acquisition device includes an anti-contamination unit 64e, which is intended for at least reducing contamination of a region of an object data acquisition unit 14e, in particular, inside of housing unit 62e. In particular, anti-contamination unit 64e takes the form of an air nozzle. In particular, anti-contamination unit 64e generates a constant air current, which is directed away from object data acquisition unit 14e.

Figure 11:
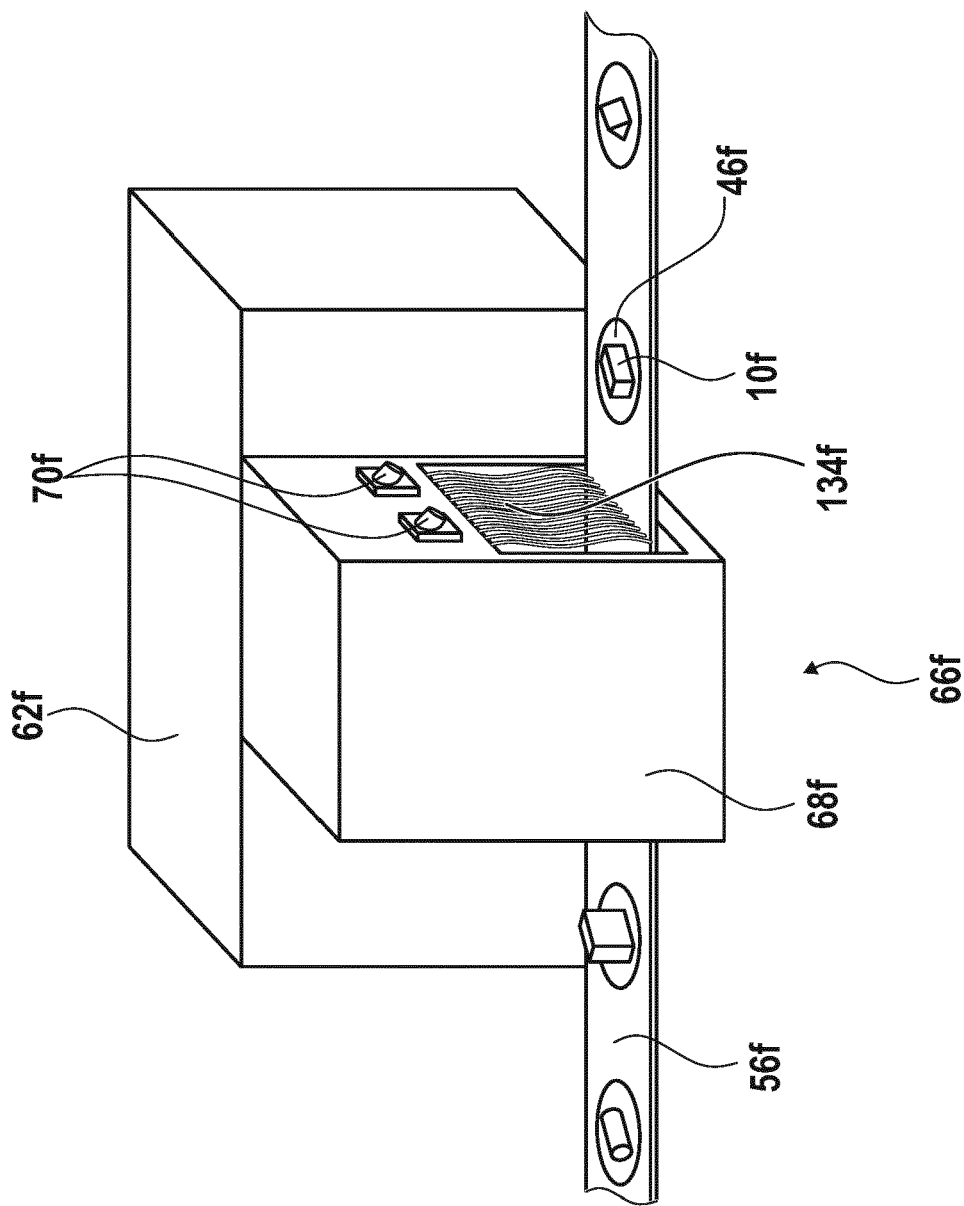
FIG. 11 shows a schematic representation of the lock chamber unit.

FIG. 11 shows the acquisition device, including a treatment unit 66f, which is intended for treating, in particular, for cleaning, at least one object 10f prior to acquisition of an object data set. Treatment unit 66f includes a lock chamber unit 68f. In particular, lock chamber unit 68f includes a fluid restriction unit 134f. Fluid restriction unit 134f has, in particular, plastic lamellae. Fluid restriction unit 134f preferably generates a flow resistance, in particular, to a flow into lock chamber unit 68f. Treatment unit 66f includes a fluid control unit 70f for controlling and/or regulating a fluid stream. Fluid control unit 70f preferably generates an air current, which is directed away from lock chamber unit 68f. An air current generated by fluid control unit 70f is preferably directed onto an object carrier 46f, which is located directly in front of fluid restriction unit 134f. An air current generated by fluid control unit 70f is intended for blowing away dust particles and other contamination, which are situated on object carrier 46f and/or on an object 10f, in particular, in a direction facing away from lock chamber unit 68f. It is possible for other fluid control units to be installed inside of lock chamber unit 68f, for example, in order to generate a pressure above atmospheric in lock chamber unit 68f. It is also possible for the lock chamber unit to include a fluid control unit for generating a water jet, in order to clean an object situated in lock chamber unit 68f. Lock chamber unit 68f preferably includes a fluid control unit in the form of a heating fan, in order to dry an object situated in lock chamber unit 68f.

What is claimed is:

1. An acquisition device for at least semiautomated acquisition of sets of multiple object data of at least one object, comprising:
   a movement device configured to generate a defined relative movement between at least one object data acquisition unit and the at least one object;
   wherein the movement device has a movement unit for detecting object data of the at least one object from multiple perspectives, and wherein the movement unit is for guiding the at least one object data acquisition unit along an at least partially curved path, and
   wherein the movement device includes a drive unit for vertically moving and for rotating an object carrier unit about a swivel axis and/or a rotational axis of a bearing unit, and wherein the at least one object data acquisition unit, in addition to being movable along the at least partially curved path, is rotationally movable about another swivel axis and/or another rotational axis of the object data acquisition unit.

2. The acquisition device as recited in claim 1, further comprising:
   an object carrier unit.

3. The acquisition device as recited in claim 2, wherein the object carrier unit includes at least one object carrier, which has an object carrier wall that is transparent in at least one operating state.

4. The acquisition device as recited in claim 2, wherein the object carrier unit includes a setting unit, using which a reflectance, an absorbance and/or transmittance is adjustable.

5. The acquisition device as recited in claim 2, wherein the object carrier unit is intended for active illumination.

6. The acquisition device as recited in claim 2, wherein the object carrier unit has at least one light source.

7. The acquisition device as recited in claim 2, wherein the object carrier unit includes at least one light-emitting diode, the at least one light-emitting diode including at least one organic light-emitting diode.

8. The acquisition device as recited in claim 2, further comprising:
   at least one illumination unit which is adjustable at least semiautomatically as a function of a parameter of the object and/or of the object data acquisition unit.

9. The acquisition device as recited in claim 2, wherein the illumination unit includes at least one subsurface illumination unit, which is situated at least partially on the object carrier unit.

10. The acquisition device as recited in claim 9, wherein the illumination unit is positioned on the object carrier unit in the form of a grid.

11. The acquisition device as recited in claim 1, wherein the movement device includes the bearing unit via which the object carrier unit is movably supported, and wherein the bearing unit has the at least one swivel axis and/or the rotational axis about which the object carrier unit is swivelably and/or rotatably supported.

12. A system, comprising:
    an acquisition device for providing at least semiautomated acquisition of sets of multiple object data of at least one object, the acquisition device including a movement device configured to generate a defined relative movement between at least one object data acquisition unit and the at least one object, wherein the movement device has a movement unit for detecting object data of the at least one object from multiple perspectives, and wherein the movement unit is for guiding the at least one object data acquisition unit along an at least partially curved path, and wherein the movement device includes a drive unit for vertically moving and for rotating an object carrier unit about a swivel axis and/or a rotational axis of a bearing unit, and wherein the at least one object data acquisition unit, in addition to being movable along the at least partially curved path, is rotationally movable about another swivel axis and/or another rotational axis of the object data acquisition unit;
    a storage unit that stores data sets generated at least partially by the acquisition device;
    a mobile acquisition unit; and
    a processing unit configured to evaluate data acquired by the mobile acquisition unit in view of at least the storage unit.

13. A method for acquiring sets of multiple object data of at least one object, the method comprising:
    utilizing an acquisition device for at least semiautomated acquisition of sets of multiple object data of at least one object;
    wherein the acquisition device includes a movement device configured to generate a defined relative movement between at least one object data acquisition unit and the at least one object,
    wherein the movement device has a movement unit for detecting object data of the at least one object from multiple perspectives, and wherein the movement unit is for guiding the at least one object data acquisition unit along an at least partially curved path, and
    wherein the movement device includes a drive unit for vertically moving and for rotating an object carrier unit about a swivel axis and/or a rotational axis of a bearing unit, and wherein the at least one object data acquisition unit, in addition to being movable along the at least partially curved path, is rotationally movable about another swivel axis and/or another rotational axis of the object data acquisition unit.

14. A method for acquiring sets of multiple object data of at least one object, the method comprising:
    utilizing a system including an acquisition device for at least semiautomated acquisition of sets of multiple object data of at least one object, wherein the acquisition device includes a movement device configured to generate a defined relative movement between at least one object data acquisition unit and the at least one object, wherein the movement device has a movement unit for detecting object data of the at least one object from multiple perspectives, wherein the movement unit is for guiding the at least one object data acquisition unit along an at least partially curved path, and wherein the movement device includes a drive unit for vertically moving and for rotating an object carrier unit about a swivel axis and/or a rotational axis of a bearing unit, and wherein the at least one object data acquisition unit, in addition to being movable along the at least partially curved path, is rotationally movable about another swivel axis and/or another rotational axis of the object data acquisition unit;

a storage unit that stores data sets generated at least partially by the acquisition device;

a mobile acquisition unit; and a processing unit configured to evaluate data acquired by the mobile acquisition unit in view of at least the storage unit.

15. The method as recited in claim 14, further comprising:

setting at least one parameter of an illumination unit at least semiautomatically as a function of at least one acquired parameter of the object;

wherein the acquisition device includes the illumination unit.

16. The method as recited in claim 14, further comprising:

setting at least one parameter of an illumination unit at least semiautomatically as a function of at least one parameter of the object data acquisition unit;

wherein the acquisition device includes the illumination unit.

17. The method as recited in claim 14, wherein the movement device includes the bearing unit via which the object carrier unit is movably supported, and wherein the bearing unit has the at least one swivel axis and/or the rotational axis about which the object carrier unit is swivelably and/or rotatably supported.

* * * * *

UNITED STATES PATENT AND TRADEMARK OFFICE
CERTIFICATE OF CORRECTION

Page 1 of 1

PATENT NO. : 12,072,182 B2
APPLICATION NO. : 16/756456
DATED : August 27, 2024
INVENTOR(S) : Darno Alexander Ketterer et al.

It is certified that error appears in the above-identified patent and that said Letters Patent is hereby corrected as shown below:

On the Title Page

Correct Item (86) PCT No.: PCT/EP2018/079464
§371 (c)(1),
(2) Date:
"April 15, 2020"

With:
--May 27, 2020--

Signed and Sealed this
Fourth Day of February, 2025

Coke Morgan Stewart
*Acting Director of the United States Patent and Trademark Office*